United States Patent [19]

Ryan et al.

[11] Patent Number: 4,821,208

[45] Date of Patent: Apr. 11, 1989

[54] DISPLAY PROCESSORS ACCOMMODATING THE DESCRIPTION OF COLOR PIXELS IN VARIABLE-LENGTH CODES

[75] Inventors: Lawrence D. Ryan, Princeton Junction, N.J.; James V. Sherrill, Andersonville, Tenn.; Robert D. Shedd, Swarthmore, Pa.; Gerald T. Caracciolo, Bordentown, N.J.

[73] Assignee: Technology, Inc., Princeton, N.J.

[21] Appl. No.: 918,305

[22] Filed: Oct. 14, 1986

[30] Foreign Application Priority Data

Jun. 18, 1986 [GB] United Kingdom ................. 8614876

[51] Int. Cl.⁴ ........................ G06F 3/153; G09G 1/28

[52] U.S. Cl. .................................... 364/518; 340/701; 340/799; 364/521

[58] Field of Search ................................ 364/518–521; 340/701–703, 721, 723, 747, 798–800

[56] References Cited

U.S. PATENT DOCUMENTS

| | | | |
|---|---|---|---|
| 4,016,544 | 4/1977 | Morita et al. | 340/172.5 |
| 4,183,046 | 1/1980 | Dalke et al. | 358/22 |
| 4,200,867 | 4/1980 | Hill | 340/703 |
| 4,206,457 | 6/1980 | Weisbecker et al. | 340/703 |
| 4,225,861 | 9/1980 | Langdon, Jr. et al. | 340/703 |
| 4,240,073 | 12/1980 | Seats et al. | 340/703 |
| 4,303,912 | 12/1981 | Stafford et al. | 340/703 |
| 4,342,029 | 7/1982 | Hofmanis et al. | 340/703 |
| 4,364,037 | 12/1982 | Walker | 340/744 |
| 4,366,476 | 12/1982 | Hickin | 340/747 |
| 4,386,345 | 5/1983 | Narveson et al. | 340/703 |
| 4,439,759 | 3/1984 | Fleming et al. | 340/703 |
| 4,475,161 | 10/1984 | Stock | 364/521 |
| 4,481,594 | 11/1984 | Staggs et al. | 364/521 |
| 4,484,187 | 11/1984 | Brown et al. | 340/703 |
| 4,490,797 | 12/1984 | Staggs et al. | 364/522 |
| 4,496,944 | 1/1985 | Collmeyer | 340/723 |
| 4,500,875 | 2/1985 | Schmitz | 340/703 |
| 4,520,358 | 5/1985 | Makino | 340/799 |
| 4,521,770 | 6/1985 | Rhyne | 340/703 |

FOREIGN PATENT DOCUMENTS 0093954 11/1983 European Pat. Off. ............ 364/518

OTHER PUBLICATIONS

M. F. Cowlishaw, "Fundamental Requirements for Picture Presentation", Feb. 1985, pp. 101–107.

*Primary Examiner*—Gary V. Harkcom
*Assistant Examiner*—H. R. Herndon
*Attorney, Agent, or Firm*—Joseph S. Tripoli

[57] ABSTRACT

A display processor, as for a small computer, processes pixel codes of various lengths. Three addressable color maps have their read addresses generated independently from portions of each pixel code. The portions of each pixel code used in generating each read address can be selected by programming.

38 Claims, 14 Drawing Sheets

DISPLAY PROCESSORS ACCOMMODATING THE DESCRIPTION OF COLOR PIXELS IN VARIABLE-LENGTH CODES

The present invention relates to improved display processors as may be used in developing computer-generated displays and, more particularly to display processors of a new type that employs a formatter for converting variable-length codes descriptive of pixels into addresses for three independently-addressable color map memories.

BACKGROUND OF THE INVENTION

The graphic images used in computer-generated displays have been stored in image memories at address locations mapping respective points at regular intervals along the raster scanning of a display image space. Each addressed location in image memory has contained a digital word, at least a portion of which has encoded the brightness, hue and saturation of a color pixel at the corresponding point in image space (and, in run-length encoding schemes, the value of succeeding pixels). A number of different schemes for encoding the brightness, hue and saturation of color pixels exist in the prior art.

One may analyze each color pixel as the sum of the three additive primary colors, red, green and blue, for example. The amplitudes of the red, green and blue components may each be coded in a number n of bits, n normally being in the range five to eight inclusive. Coding may be linear, logarithmic, or in accordance with some other function. It is also known to linearly encode red, green and blue in different numbers p, q and r of bits depending on their relative contributions to luminance. Encoding green in seven bits, red in five bits and blue in four bits is an example of such coding. The reader is referred to M. F. Cowlishaw's paper "Fundamental Requirements for Picture Presentation" appearing on pages 101–107 of PROCEEDINGS OF THE SID, Vol. 26/2, 1985, for a comprehensive treatment of coding additive primary colors in differing numbers of bits.

One may analyze each color pixel as the sum of a luminance-only primary color and two chrominance-only primary colors. The luminance-only primary represents whiteness or brightness of the pixel. The chrominance-only primaries do not correspond with any real color, but together are representative of the difference of any real color from the luminance-only primary. So the number of bits in these chrominance-only primaries differ little from the number of bits in the luminance-only primary, in order to avoid quantization errors in the summation of the primaries giving rise to posterization in the display.

One may arbitrarily code color values as addresses for memories, referred to as a color map memories. The memories respond to these addresses to supply, as read output, drive signals to the color display device that cause the desired color to be displayed. The memories, though operated as a read-only memories, may have provisions for changing the color maps they store. To facilitate changing the color maps these memories may be electrically-erasable programmable read-only memories or they may be random-access memories.

It is sought in a small computer system to provide a high degree of interchangeability among these various modes of image handling, so much so that composite displays comprising both computer-generated and camera-originated images as components can be created. A problem encountered in attempting to make such an image display processor is that pixels n camera-originated images of high quality are described by codes up to twenty-four bits long, which pixel codes are substantially longer codes in terms of bits than those normally used to describe the pixels of a graphics image in a computer-generated display.

SUMMARY OF THE INVENTION

A display processor embodying the invention uses first, second and third color map memories. The display is generated from the three primary colors that the outputs of these three color map memories respectively supply. Pixel data are encoded in several-bit word per pixel format, the several bits being provided by augmenting with ZEROs any pixel data originally encoded in few-bit-word per pixel format. Addressing for the first color map memory is generated from a first selected portion of each several-bit word. Addressing for the second color map memory is generated from a second selected portion of each several-bit word. Addressing for the third color map is generated from a third selected portion of each several-bit word. Provision is made for allowing, at least part of the time, one of the first, second and third selected portions of each several-bit word to differ from the others.

Figure 1:
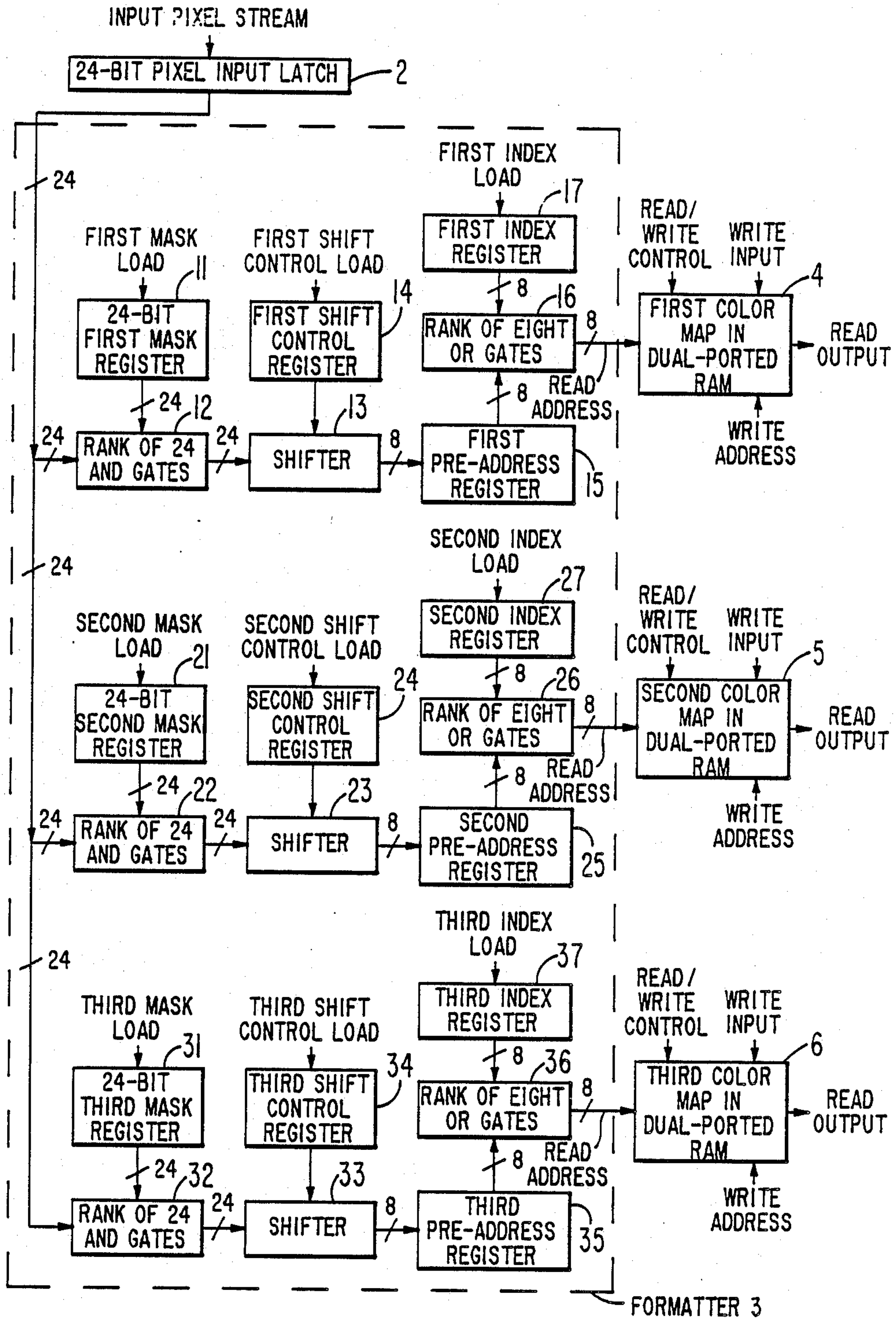
FIG. 1 is a block schematic diagram of a display processor embodying the invention.
Figure 2:
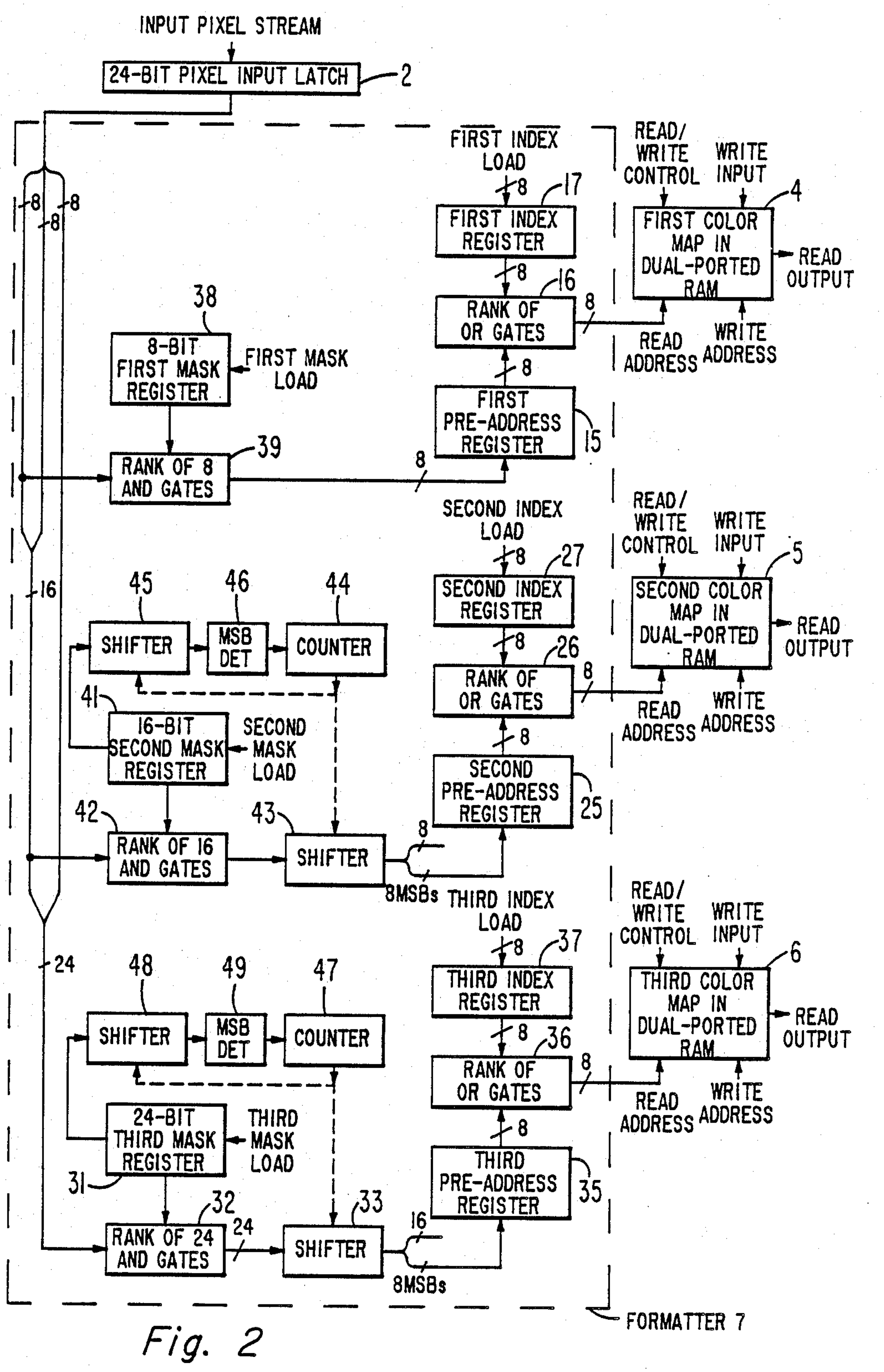
Figure 3:
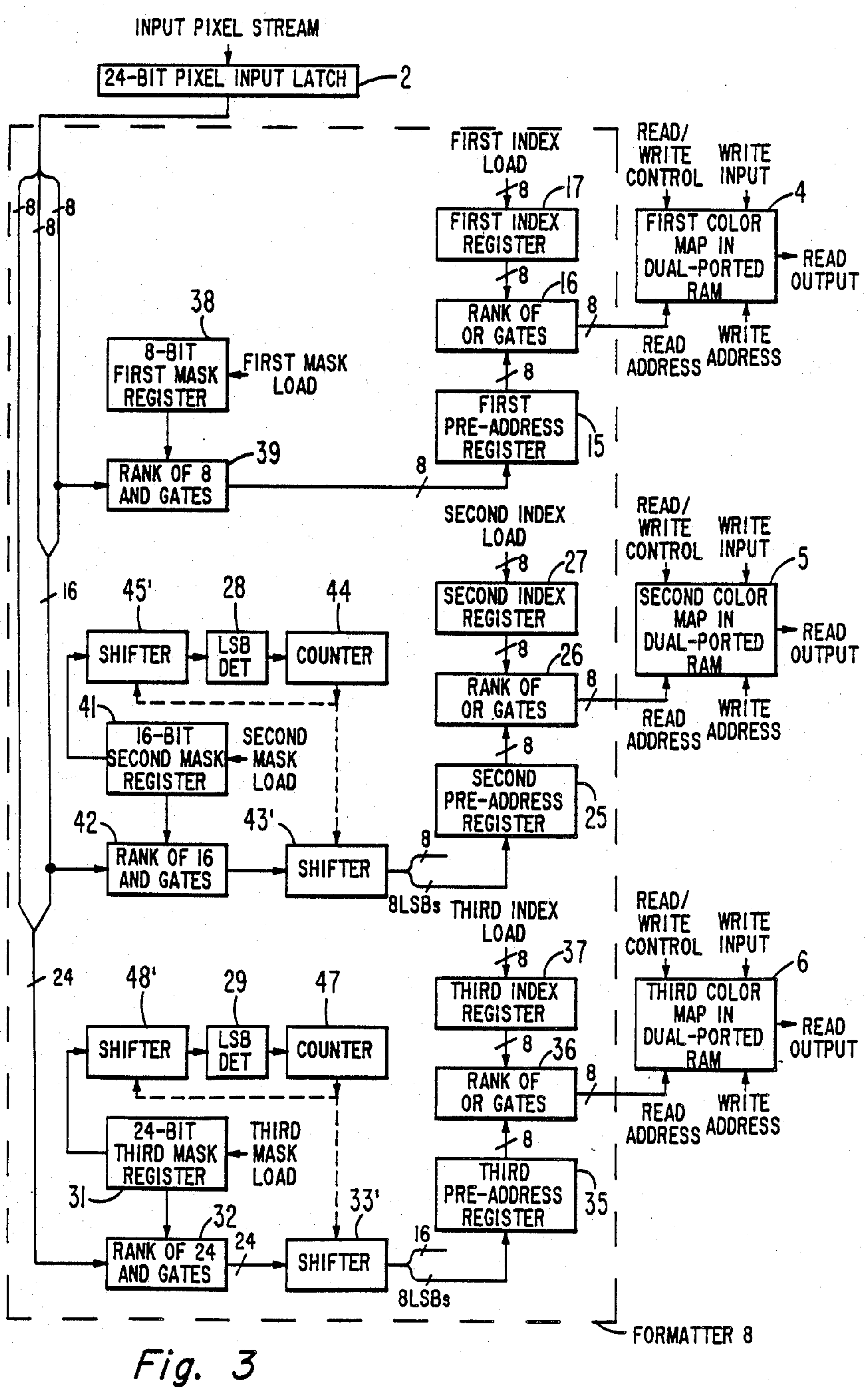

Each of FIGS. 2 and 3 is a block schematic diagram of a modified FIG. 1 display processor, also embodying the invention.

Figure 4:
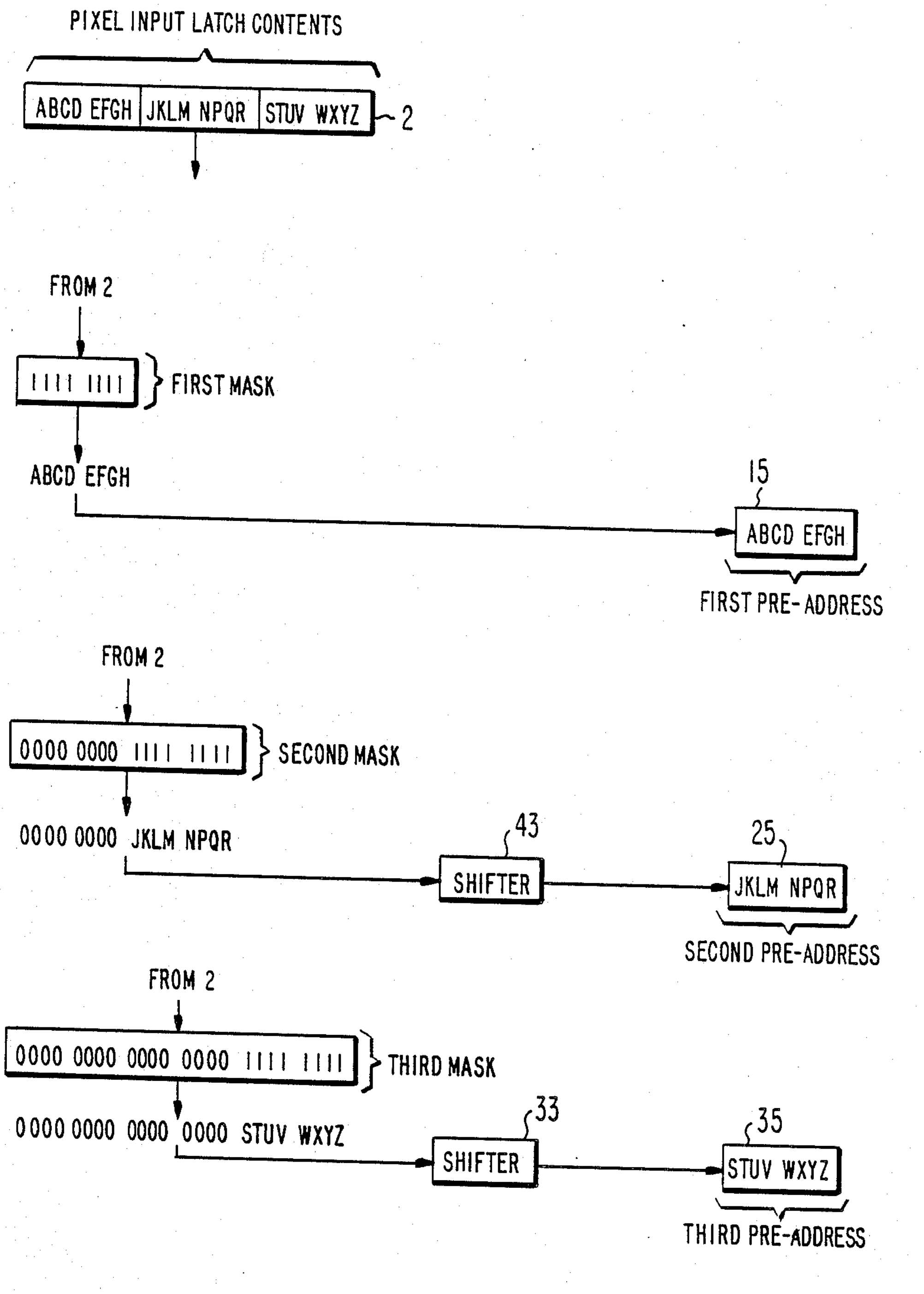
Figure 5:
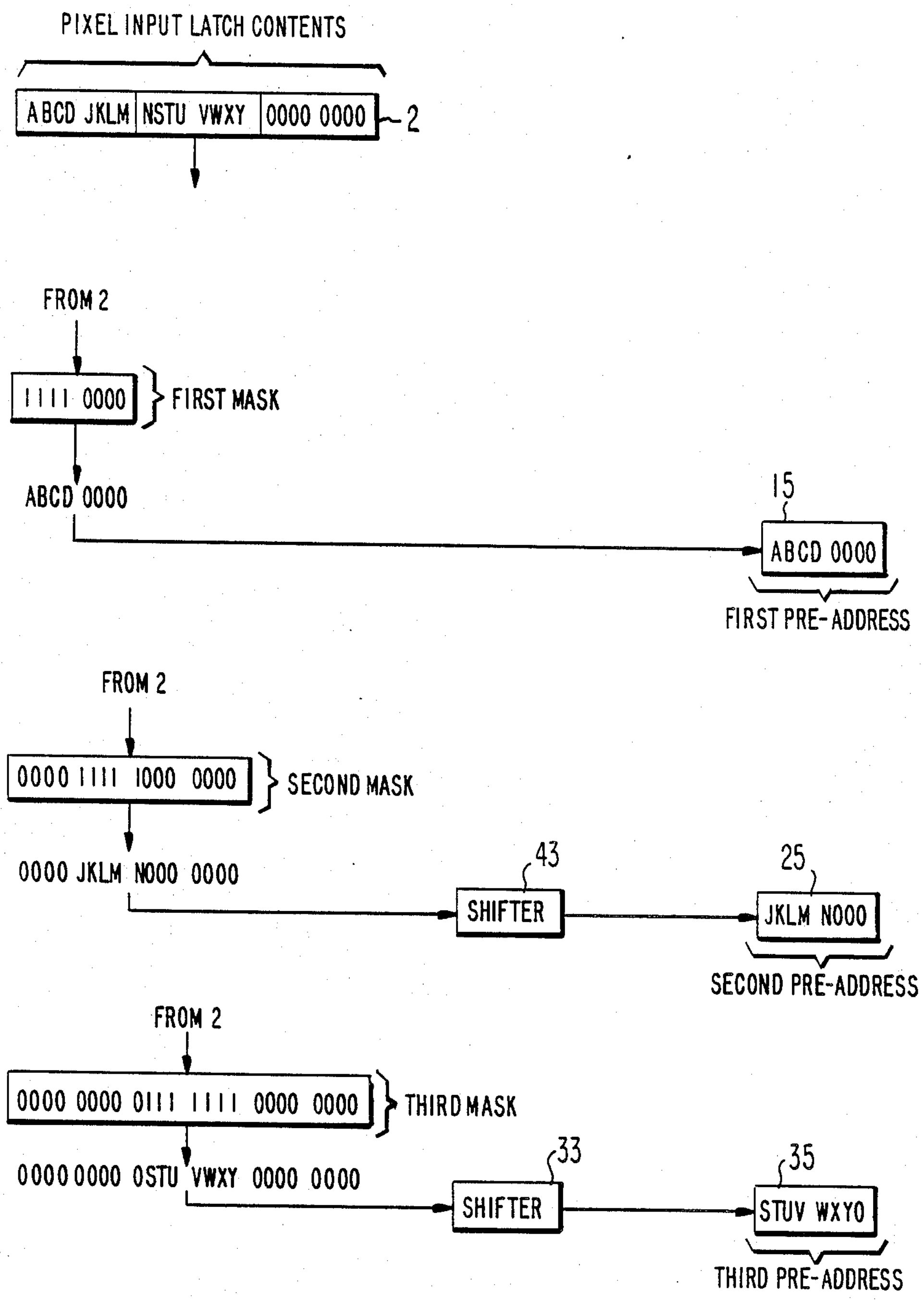
Figure 6:
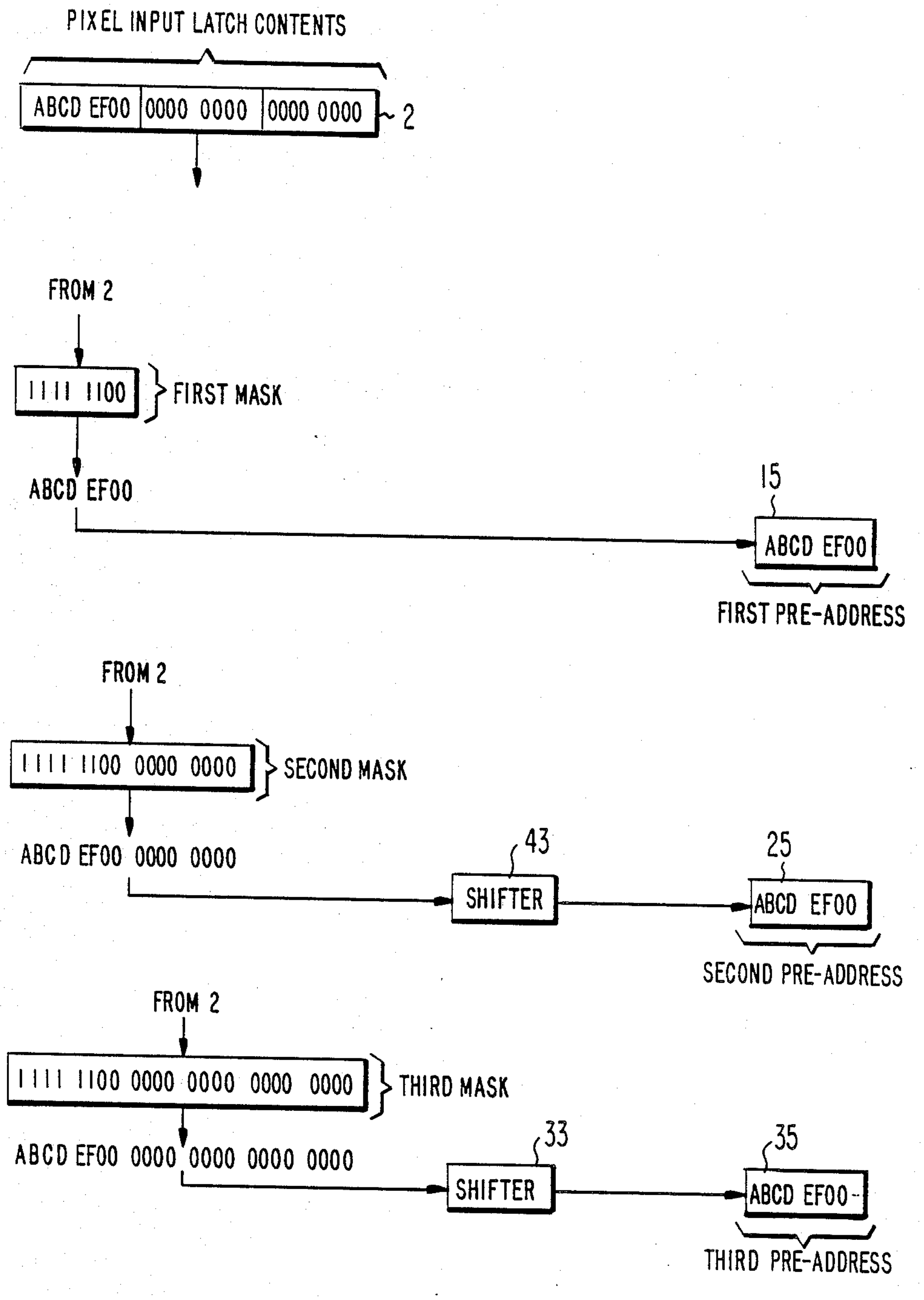

FIGS. 4, 5 and 6 are diagrams illustrating three of the many pixel data formatting schemes possible in the FIG. 2 display processor.

FIGS. 7, 8, 9 and 10 are diagrams illustrating four of the many pixel data formatting schemes possible in the FIG. 3 display processor.

Figure 11:
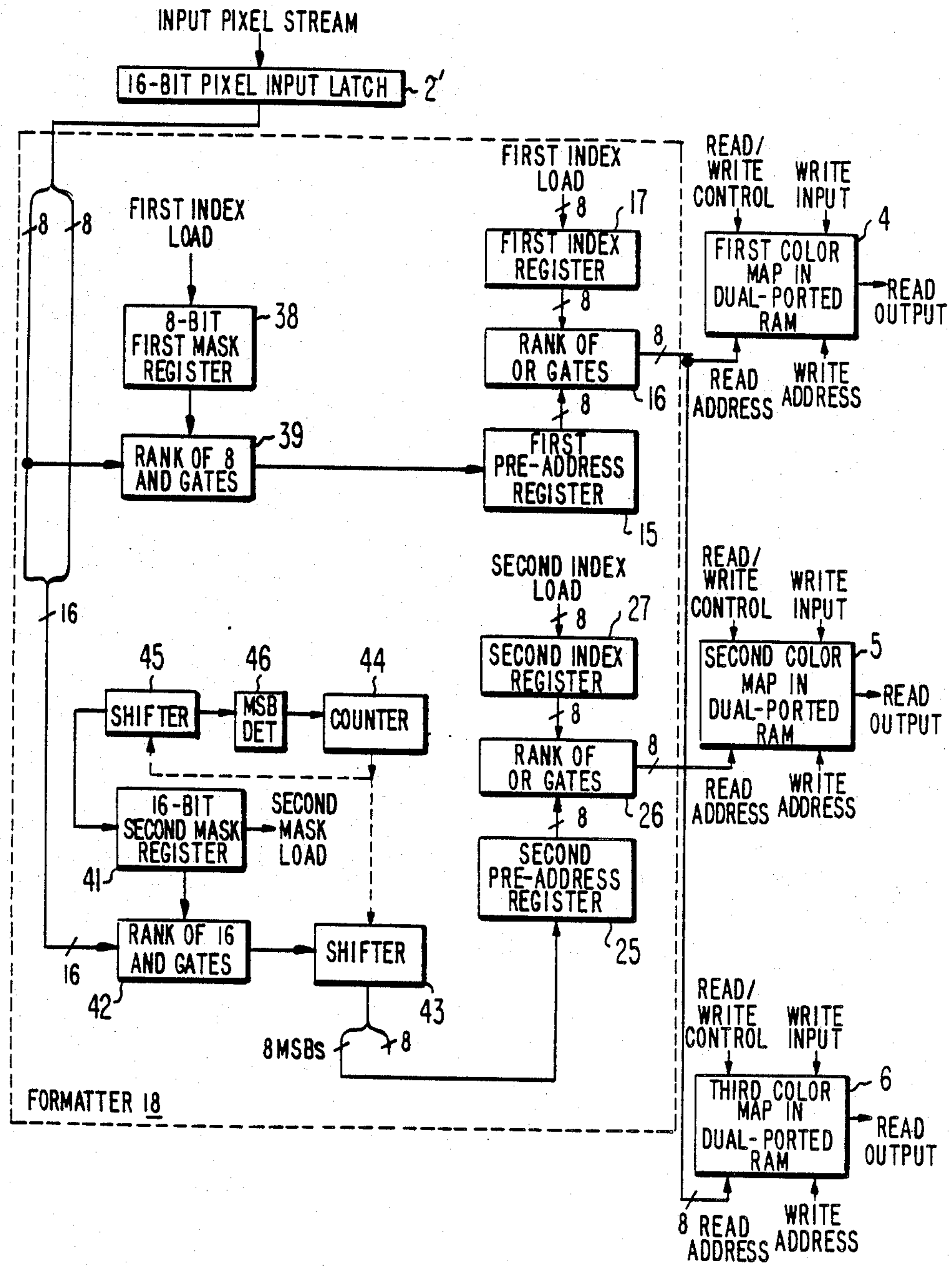

FIG. 11 is a block schematic of a modified FIG. 2 display processor, also embodying the invention.

Figure 12:
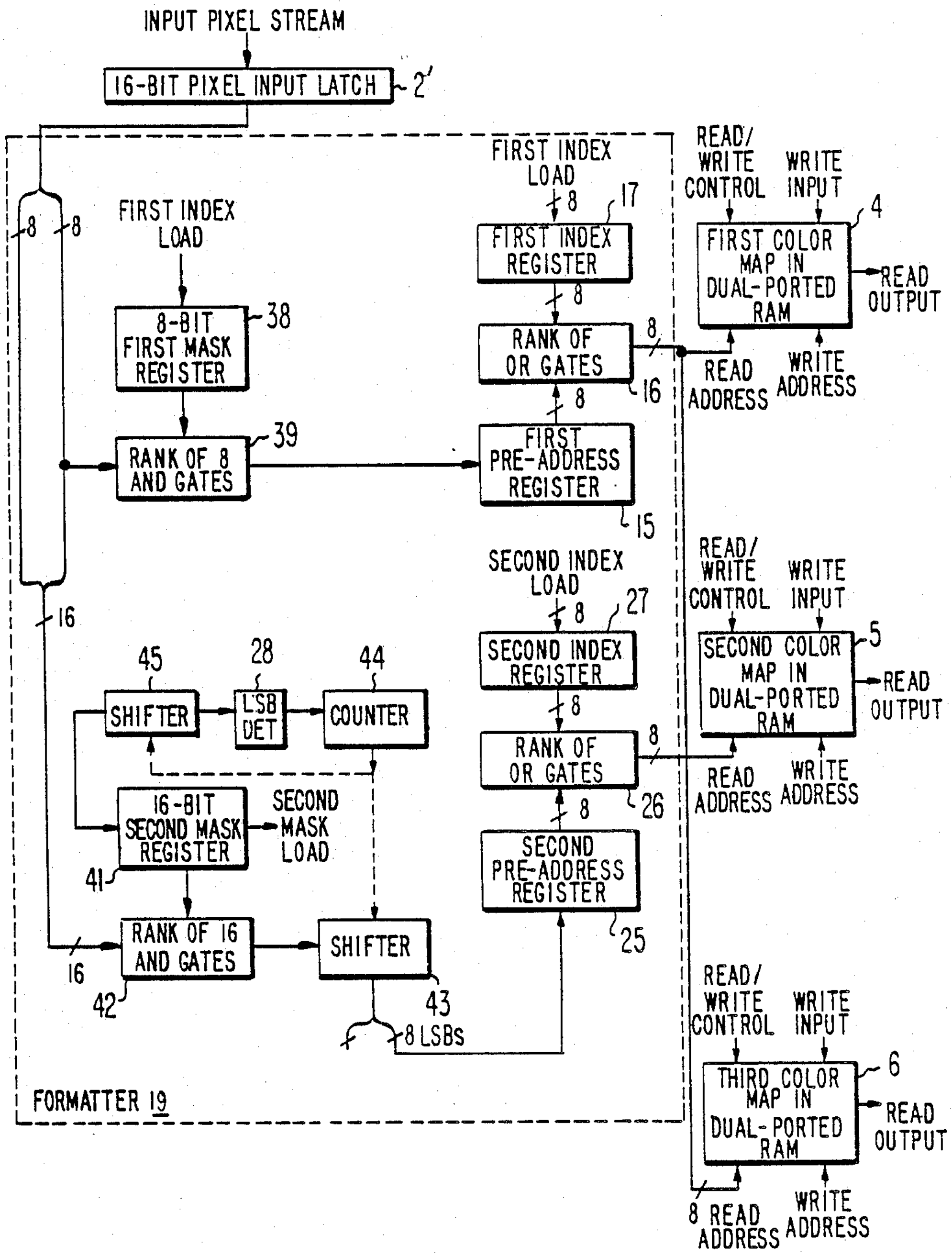

FIG. 12 is a block schematic of a modified FIG. 3 display processor, also embodying the invention.

Figure 13:
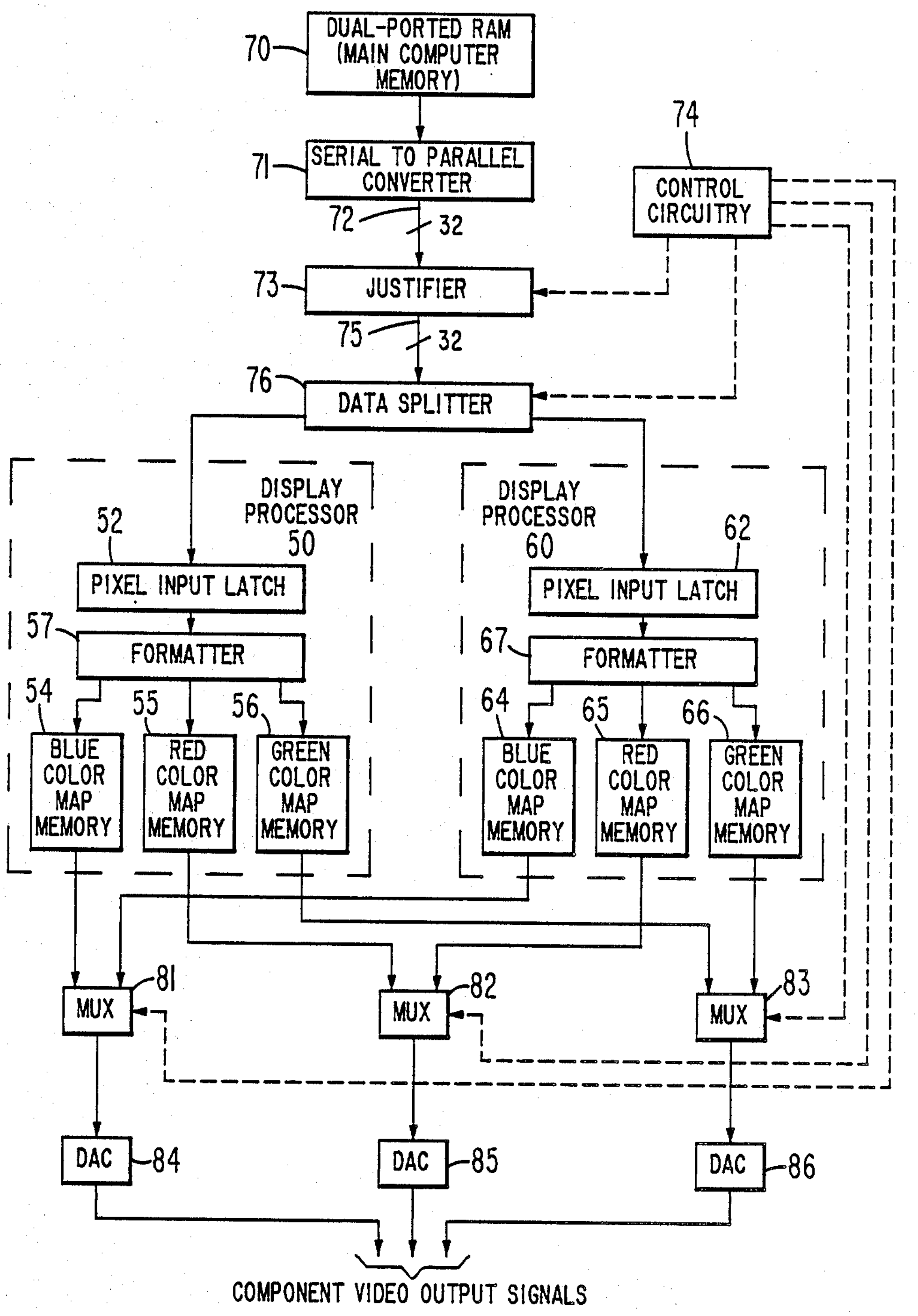

FIG. 13 is a block diagram of two display processors of the type in FIGS. 1, 2 3, 11 or 12 arranged to be operated in parallel or in banked operation, in accordance with a further aspect of the invention.

Figure 14:
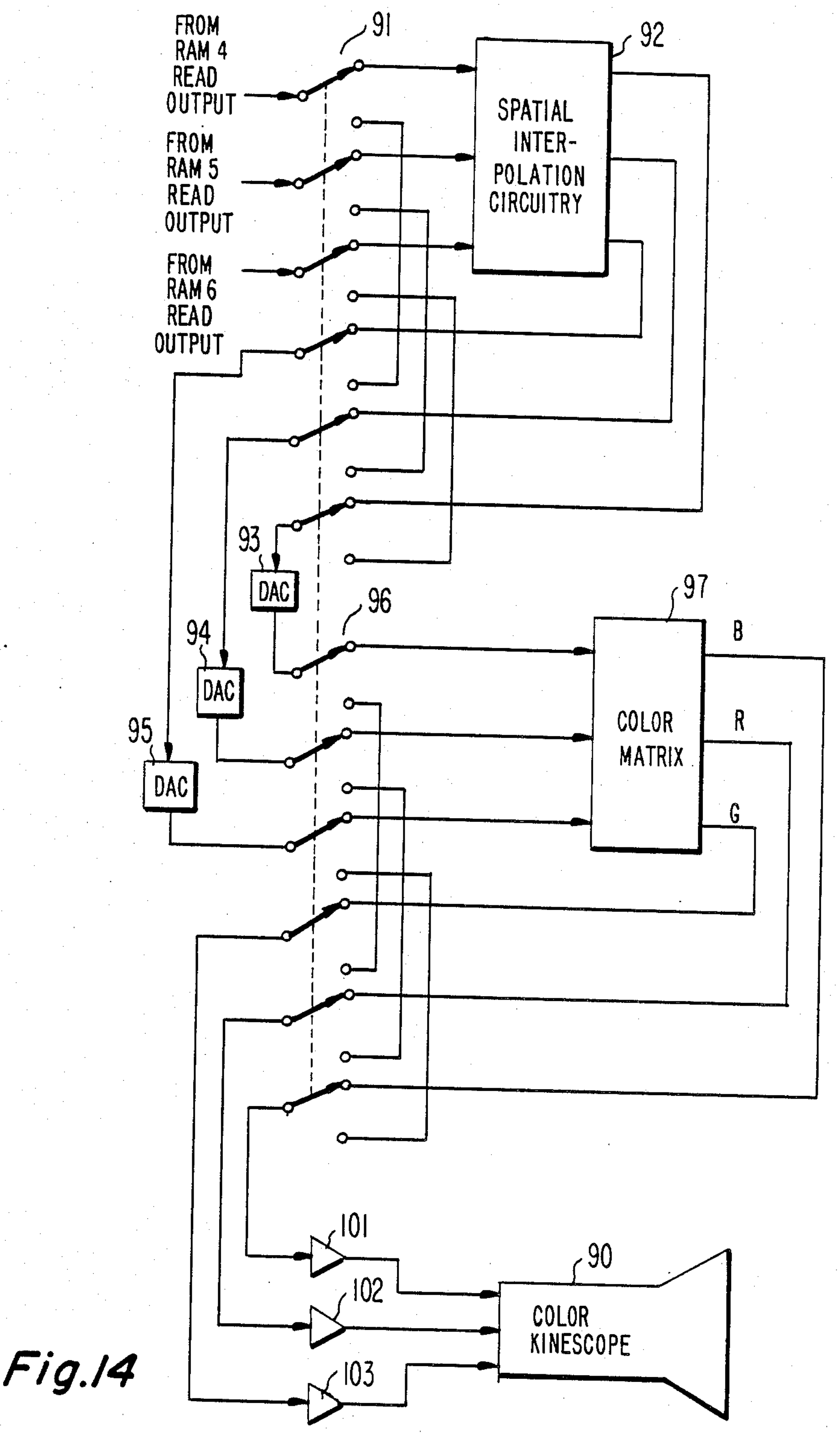

FIG. 14 is a block schematic of display that can follow the display processor of FIGS. 1, 2, 3, 11 or 12.

DETAILED DESCRIPTION

The FIG. 1 display processor can be used together with a data storage system using disks or tape, a digital random-access memory (RAM), a general data processor, a drawing processor, and a display device to form a small computer with graphics capability. The drawing processor processes graphics information supplied by the data storage system and writes image data into portions of the RAM allocated to image storage, to be stored in a format convenient for the display processor to utilize. The image data are stored in the RAM in bit-map-organization; i.e., for each component of the description of a picture element (pixel) in the image displayed by the display device, there is a respective storage location in memory. During the reading of the image storing portions of the RAM, these storage locations are addressed in raster scan order in synchronism with scanning of the display device screen, to supply pixel data to the display processor. The RAM in addition to storing graphics information may also store data for processing in the general data processor. The RAM may also store operating instructions for the general data processor, for the drawing processor, and/or for the FIG. 1 display processor. Several purpose usage of RAM is common in a small computer, and this RAM shall hereinafter be called "computer main memory".

In the FIG. 1 display processor an input latch 2 receives successive words, each descriptive of a pixel. These words can be selected from pixel data supplied from computer main memory, which is bit-map-organized with respect to stored images. A favored computer main memory architecture is one using video dynamic random-access memory (VRAM) integrated circuits. Such a circuit is dual-ported, having a random-access input/output port like a conventional dynamic random-access memory, but also having an additional serial output port. This serial output port is at the end of a shift register that can be side-loaded with a complete line of video samples in the time required for a normal random access. The shift register when loaded can be clocked at high rate to deliver the line of video samples at rates much higher than attainable by normal random access.

The computer main memory output port may be thirty-two bits wide, for example. The breaking up into individual words descriptive of respective pixels is carried out in pixel unwrapping circuitry (not shown in FIG. 1). This breaking up is in accordance with instructions appropriate to the type of pixel descriptions used for storing pixel data. The largest pixel descriptions will contain twenty-four bits, one byte width for each of three primary color components of a pixel. Accordingly, input latch 2 is provided with twenty-four bit places of storage. If there are fewer than twenty-four bits in a word descriptive of a respective pixel that is supplied to input latch 2, the remaining bit places are loaded as ZEROs.

The twenty-four bit word held in latch 2 is the input for a formatter 3 that generates read addresses for a first color map memory 4, a second color map memory 5 and a third color map memory 6. The color map memories 4, 5, 6 supply respective color component signals, which can be applied to display apparatus (not shown) used for reconstructing a color image on a screen. The color maps are preferably RAMs operated as read-only memories (ROMs), so that they can be loaded with any desired color map data by down-loading from the computer main memory. It is convenient to do this down-loading during the field retrace intervals in the video signal samples color map memories 4, 5 and 6 deliver to the display apparatus. Supposing the computer main memory uses VRAMs, down-loading from the serial output port of that memory can be done at so high a rate that it is practical to down-load during line trace interval, as well. Assuming, for example, that the computer main memory has a serial output port thirty-two bits wide, eight bits of that output can be used to address the color map memories 4, 5 and 6 during their writing. The other twenty four bits can be apportioned into byte-width groups respectively applied to color map memories 4, 5 and 6 as write inputs.

Color map memories 4, 5 and 6 are shown as being dual-ported in the sense of having separate read output and write inputs, but multiplexing arrangements may be made so that RAMs having a single input/output bus may be used instead. Color map memories are shown as having separate read addresses and write address inputs, but there may be arrangements for multiplexing both sets of addresses through the same address bus in each of the color map memories 4, 5 and 6. The contents of registers in the formatter 3 may be programmed by down-loading from the random access input/output port of computer main memory. Or, the multiplexing of computer main memory read-out through its serial output port may be made more complicated, so these registers can be programmed from that read-out.

The first, second and third color map memories 4, 5 and 6 may store values of green, red and blue drive signals, respectively, for direct application to the color display device. This permits the number of bits in the outputs of the three color map memories to be apportioned in accordance with the contributions of the three additive primaries to luminance. Green values may be stored with two bits more resolution than red values and with three bits more resolution than blue values, for example. This tends to apportion total color map memory capability to provide better overall apparent resolution in the color display.

Where the computer generally handles graphic images and seldom or never has to process camera-originated images making the color map memories 4, 5 and 6 store red, green and blue display-device drive signals is a likely design choice. This is because these additive primaries are always positive-valued and are truly independent variables, so image calculations can be more simply made. Also most display apparatus ultimately requires red, green and blue drive signals.

But where the computer often is called upon to handle camera-originated images, the drawing processor is likely to receive pixel data in terms of luminance-only information with full spatial resolution and chrominance-only information with reduced spatial resolution. That is, in the original digitized camera responses, luminance is sampled at full density in both horizontal and vertical directions in display image, while chrominance is subsampled at sparser density in at least one of these directions and preferably in both of them. The drawing processor is simplified by storing images in the computer main memory in terms of a luminance-only variable and chrominance-only variables.

To implement pixel data in such formats being routed through formatter 3 to generate read addressing for color map memories 4, 5 and 6, it is desirable to make one of these memories store a luminance-only variable and be addressable in a luminance-only coordinate system; and it is further desirable to make each of the other two memories to store respective ones of two chrominance-only variables and be addressable in a chrominance-only coordinate system. This chrominance-only coordinate system may consist of two orthogonal chrominance-only component coordinates descriptive of respective chrominance-only primary colors, for example. Or it may consist of a set of arbitrary chrominance codes, as another example. The second color map memory 5 stores values of the luminance-only primary color. The first and third color map memories 4 and 6 store values of a first chrominance-only primary color and values of a second chrominance-only primary color, respectively. The values of these primary colors as read from color map memories 4, 5 and 6 are then matrixed (in circuitry not shown in FIG. 1) to generate red, blue and green drive signals for the color display device.

In order to combine the chrominance-only signals with the luminance-only signal they must be restored to full spatial resolution by interpolation. Spatial interpolation can be carried forward successfully only when pixels are described in terms of primary color components. If any of the color map memories 4, 5 and 6 can be addressed in other terms (such as arbitrary chrominance codes, for example) interpolation should be among color map memory read-outs, rather than among their read addresses.

Assuming spatial interpolation is to be done in two dimensions (i.e., in both the horizontal and vertical directions), it is best arranged for as follows. A rate-buffering memory (not shown in FIG. 1) is provided between computer main memory and pixel input latch 2, which rate-buffering memory supplies on a time-interleaved basis, during any line trace interval, the color map memory read addresses associated with two adjacent lines of pixels. These successive read addresses are temporarily stored in those bit positions of pixel input latch 2 that are associated with the chrominance-only coordinates used to address color map memories 5 and 6. This arranges for four successive read-outs of the color map memories 5 and 6 to define the sets of four closely grouped subsamples needed for two-dimensional (e.g., bilinear) spatial interpolation. Spatial interpolation circuitry (not shown in FIG. 1) brings the four subsamples into temporal alignment, and they are weighted according to the position the full-density sample resulting from interpolation is to have in the image field respective to the positions of the subsamples. Differential delay between the luminance-only primary color samples (on one hand) and the chrominance-only primary color samples obtained by interpolation (on the other hand) are compensated for. It is usually best to provide this compensation in the rate-buffering memory located between computer main memory and the pixel input latch 2 of the formatter.

A preferred arrangement is to load the rate-buffering memory with chrominance-only information down-loaded during line retrace intervals from the serial output ports of VRAMs serving as computer main memory, so the serial output ports are free to supply only luminance-only information during line trace intervals. In embodiments of the invention wherein ones of the color map memories 4, 5 and 6 are re-written by data also down-loaded from the serial output ports of these VRAMs during line retrace intervals, there will be competition for the limited time available during line retrace intervals, a fact which a designer must take into account.

If there is to be interpolation of the chrominance-only primary colors read from color map memories 4 and 6, the independent addressing of color map memories 4 and 6 from color map memory 5 (used as a luminance map) is required. This because the sampling pattern of read addresses supplied color map memories 4 and 6 differs from the sampling pattern of read addresses supplied to color map memory 5.

Consider now the construction of formatter 3. Formatter 3 is used to generate read addresses for color map memories 4, 5 and 6 from the pixel data held in input latch 2. Respective portions of this pixel data are selected as bases for generating these read addresses, selection being made in accordance with first, second and third masks for the twenty-four bits of this data.

A first twenty-four bit mask has a group of contiguous ONEs identifying positions in latch 2 output to be selected as a basis for generating first color map memory 4 read address, has ZEROs identifying positions in latch 2 output not to be so selected, and has been previously loaded into a mask register 11 from computer main memory under direction of the data processor. The bit-places in mask register 11 output are respective first inputs to a rank 12 of twenty-four AND gates, the respective second inputs of which are respective bit places of the output from input latch 2. The output of the rank 12 of AND gates is ZERO-valued in all its places corresponding to ZEROs in the first mask output of mask register 11. The remaining bit places in the output of the rank 12 of AND gates are a first selected portion of input latch 2 output. The output of the rank 12 of AND gates is supplied as input to a shifter 13 which will justify the first selected portion of latch 2 output.

Shifter 13 performs a barrel-shift function wherein the twenty-four bits supplied as output from the rank 12 of AND gates are shifted in one of two ways. The bits in the twenty-four bit places of shifter 13 output could be shifted towards increased significance with any overflow bit being shifted into the vacated least significant bit place, or the bits in the twenty-four bit places of shifter 13 output could be shifted towards decreased significance with any underflow bit being shifted into the vacated most significant bit place. Either direction of shifts can achieve the same result given enough bit places of shift, so shifter 13 is more simply constructed if it invariably shifts in one direction. The number of bit places of shift in the selected direction can then be programmably specified by a positive binary number previously loaded into a first shift control register 14 and stored there until register 14 contents are up-dated.

As each pixel is scanned, a first pre-address register 15 is loaded from eight of the bit places of shifter 13 output, which bit places contain the first selected portion of latch 2 output passing through the first mask. Shifter 13 customarily justifies this first selected portion of latch 2 output, either so its most significant bit is in the most significant of the eight-bit places of shifter 13 output which loads first pre-address register 15, or so its least significant bit is in the least significant of these eight-bit places of shifter 13 output. Pre-address register 15 stores the first selected portion of latch 2 output and applies respective ones of its bit places as respective first inputs to a rank 16 of OR gates. OR gates in rank 16 receive as their respective second inputs respective ones of the bit places of a first index supplied from a first index register 17. The first index has previously been loaded from computer main memory. The output of the rank 16 of OR gates is the read address for first color map memory 4.

The read addresses for second color map memory 5 are generated by elements 21–27 in syntactic similarity with the read addresses for first color map memory being generated by elements 11–17. The read addresses for third color map memory 6 are generated by elements 31–37 in syntactic similarity with the read addresses for first color map memory being generated by elements 11–17.

It is convenient to make the shifters 13, 23 and 33, in the following way so that they shift in accordance with a binary number control signal. Each of the shifters 13, 23 and 33 is a cascade connection of a number of component shifters. A first component shifter has a respective multiplexer selecting between no shift and one-bit place shift responsive to the least significant bit of counter output being ZERO and being ONE respectively. A second component shifter has a respective multiplexer selecting between no shift and two-bit places shift responsive to the second last significant bit of counter output being ZERO and being ONE respectively. Any $k^{th}$ one of the component shifters, that is, has a respective multiplexer selecting between no shift and $2^k$-bit-places shift responsive to the $k^{th}$-least significant bit of counter output being ZERO and being ONE, respectively. The total shift available from any of the shifters 13, 23 and 33 is then the sum of the bit places of shift of its cascaded component shifters. In the remaining portion of this specification it will be assumed that shifters 13, 23 and 33 shift in the direction of increased significance as the binary numbers used as their respective control signals are incremented in value.

Modifications may be made to the FIG. 1 display processor formatter 3 so that its programming can be simplified. If one is willing to justify the input to the pre-address registers 15, 25 and 35 always in the same direction, the justifications can be performed automatically using the information stored in the mask registers. This avoids the need for programming to load first, second and third shift control data into shift control registers 14, 24 and 34. FIG. 2 display processor formatter 7 is such a modification wherein automatic pre-address justification, if required, is always in the direction of increased significance. FIG. 3 display processor formatter 8 is such a modification wherein automatic pre-address justification, if required, is always in the direction of decreased significance. After describing the structure of the FIG. 2 and FIG. 3 display processor formatters 7 and 8 in more detail, the justification procedures will be described in more detail based on operation in formatters 7 and 8. These descriptions will make apparent the operation possible in the FIG. 1 display processor, since formatter 3 is capable of simulating any operation that is possible in either of formatters 7 and 8.

In the FIG. 2 display processor, data which completely describe a pixel in less than twenty-four bits are loaded into input latch 2 so that they occupy the most significant bit places in its output. Any remaining less significant bit places in latch 2 output are preferably filled with ZEROs. Data which completely describe a pixel in exactly twenty-four bits are loaded into pixel input latch 2 without using ZERO insertion.

The pixel data on which first color map memory 4 read addresses are to be based are constrained invariably to be grouped in the eight most significant bits of latch 2 output. The first selected portion of latch 2 output is constrained to be no more than eight bits wide. This allows the mask register 11 with twenty-four bit places storage to be replaced by a mask register 38 with only eight bit places storage. This also allows the rank 12 of twenty-four AND gates to be replaced by a rank 39 of only eight AND gates for selecting the first portion of latch 2 output. No shifter is required for aligning the output of the rank 39 of AND gates with pre-address register 15 input.

The pixel data n which second color map memory 5 read addresses are to be based are constrained invariably to be grouped in the sixteen most significant bits of latch 2 output. The second selected portion of latch 2 output is constrained to be no more than eight bits wide, but this byte-width need not coincide with nor overlap the byte-width allocated for pixel data on which read addresses of first color map memory 4 are based. Mask register 41 with only sixteen bit places storage suffices to store the second mask, then, and replaces the wider mask register 21. A rank 42 of only sixteen AND gates replaces the rank 22 of twenty-four AND gates.

A shifter 43 with only 16-bit input capacity replaces shifter 23 with 24-bit input capacity. The justification is to be made so shifter 43 will barrel-shift that second selected portion of latch 2 output to the most significant bit places for loading pre-address register 25. In a barrel-shift in the direction towards increased significance, the less significant bits of a number with a fixed number of bit places are shifted towards increased significance, with the overflowing more significant bits being inserted into the vacated less significant bit places. The number of bit places involved in the barrel-shift that shifter 43 provided is specified by the count output of a clocked counter 44, which count output also specifies the number of bit places another shifter 45 barrel-shifts towards more significance in its output the first mask it receives as input from first mask register 41. The most-significant bit place of shifter 45 is applied to a detector 46 to generate a shift signal if that bit place be ZERO, which shift signal is transmitted as count input to counter 44. More particularly, detector 46 may comprise a simple bit complementor, with the clocking of counter 44 sampling the complementor output. The second pre-address register 25 is loaded from the eight most significant bit places of sifter 43 output, with justification of the second selected portion of latch 2 pixel data being in the direction of increased significance.

The pixel data on which third color map memory 6 read addresses are to be based can be grouped anywhere in the twenty-four bits of input latch 2. The third selected portion of latch 2 output is selected by the rank 32 of twenty-four AND gates responsive to a third mask stored in the mask register 31, just as in the formatter 3 of the FIG. 1 display processor. The third selected portion of latch 2 output is justified in the direction of increased significance by the shifter 33 in formatter 7, just as in formatter 3. But in formatter 7 of the FIG. 2 display processor the number of bit places of shift through shifter 33 is specified by the count stored in counter 47. This count also specifies the number of bits by which the third mask content of register 31 is shifted in the output of a shifter 48, similar to shifter 33. Shifters 33 and 48 shift towards increased significance in the outputs as the count in counter 47 is augmented. The most significant bit of shifter 48 output is applied to a detector 49 to generate a shift signal if that bit place be ZERO, which shift signal is transmitted as count input to counter 47. The third pre-address register 35 is loaded from the eight most significant bit places of shifter 33 output, with justification of the third selected portion of latch 2 pixel data being in the direction of increased significance.

In formatter 8 of the FIG. 3 display processor the justifications of the first, second and third pre-addresses loaded into registers 15, 25 and 35 is automatic and is invariably in the direction of decreasing significance, rather than increasing significance as was the case in the formatter 7 of the FIG. 2 display processor. In the FIG. 3 data processor, data which completely describe a pixel in less than twenty-four bits are loaded into input latch 2 so that they occupy the least significant places in its output. Any remaining more significant bit places in input latch 2 output are preferably filled with ZEROs. As before, data which completely describe a pixel in exactly twenty-four bits are loaded into pixel input latch 2 without using ZERO insertion. The differences formatter 8 in FIG. 3 has from formatter 7 in FIG. 2 will now be described.

The pixel data on which first color map memory 4 read addresses are to be based are constrained invariably to be grouped in the eight least significant bit places of input latch 2 output. The pixel data on which second color map memory 5 read addresses are to be based are constrained to be grouped in the sixteen least significant bit places of input latch 2 output.

The outputs of shifters 43' and 45' shift another bit place towards decreased significance responsive to the count contained in counter 44 being augmented. The count in counter 44 is augmented when a detector 28 detects a ZERO in the least significant bit place of shifter 45' output. The eight least significant bit places of shifter 43' output load the second pre-addresses into register 25.

The outputs of shifters 33' and 48' shift another bit place towards decreased significance responsive to the count contained in counter 47 being augmented. The count in counter 47 is augmented when a detector 29 detects a ZERO in the least significant bit place of shifter 48' output. The eight least significant bit places of shifter 33' output load the third pre-addresses into register 35.

Consider now how different pixel data formats are accommodated by the FIG. 2 formatter 7; these considerations will also educate the reader concerning how the more flexible FIG. 1 formatter 3 may be employed. FIGS. 4–6 abstract the FIG. 2 block schematic diagram to indicate the nature of the pixel data contained in input pixel data latch 2; in mask registers 38, 41 and 31; and in pre-address registers 15, 25 and 35. In considering FIGS. 4–6 assume the first, second and third indices to be zero-valued, so the contents of the pre-address registers 15, 25 and 35 correspond to the read addresses of color map memories 4, 5 and 6 respectively.

FIG. 4 shows how pixel data flows from latch 2 to pre-address registers 15, 25 and 35 in formatter 7 when 8-bit red (R), 8-bit green (G), 8-bit blue (B) pixel descriptions, for example, are used in computer main memory. Alternatively, FIG. 4 may be considered to show how pixel data flows from latch 2 to pre-address registers 15, 25 and 35 when 8-bit Y, 8-bit (R-Y), 8-bit (B-Y) or 8-bit Y, 8-bit I, 8-bit Q pixel descriptions are used. (Y is luminance-only primary; (R-Y) and (B-Y) or I and Q are first and second chrominance-only primaries.) The three-byte pixel data input latch 2 is filled with a 24-bit number ABCD EFGH JKLM NPQR STUV WXYZ where each letter represents either a ONE or ZERO. The eight-bit first mask (as stored in mask register 38) is all ONEs; and ABCD EFGH, the initial eight bits of latch 2 content, are selected by AND gates in rank 39 for insertion into first pre-address register 15. The sixteen-bit second mask (as stored in mask register 41) is eight ZEROs in its more significant places followed by eight ONEs in its less significant places. JKLM NPQR, the middle eight bits of latch 2 content, are selected by AND gates in rank 42, are shifted by shifter 43, and are inserted into second pre-address register 25. The twenty-four bit third mask (as stored in mask register 31) is sixteen ZEROs in its more significant places followed by eight ONEs in its less significant places. STUV WXYZ, the eight least significant bits of latch 2 content, are selected by AND gates in rank 32, are shifted by shifter 33, and are inserted into third pre-address register 35.

In this mode of operation the first, second and third indices are zero-valued; and each of the color map memories 4, 5, 6 may store in its storage locations output signals equal to the read addresses for those storage locations. This in effect forwards the contents of the pre-address registers 15, 25 and 35 as drive signals to the display device. Alternatively, each of the first, second and third indices are zero-valued; and the color map memories may be programmed to provide non-linear response to the contents of pre-address registers 15, 25 and 35. This procedure can be used to remove unwanted gamma correction from broadcast television images, for example, to suit the images for display on a computer monitor designed to use non-gamma-corrected video, as is common in digital graphics images. In Y,I,Q operation non-linear responses from the color map memories 4, 5, 6 may be used to provide better rendition in pastels in computer-originated images by allowing resolution of the chrominance-only primaries to be higher near white than for saturated red, green or blue. The independent addressing of color map memories 4, 5, 6 is what permits them to be used to provide, at the computer programmer's option, linear or non-linear processing of the component video signals descriptive of camera-originated images or images simulated them. The independent addressing of memories 4, 5, 6 enables them to function for these purposes in addition to performing the more conventional color mapping chores associated with graphic image handling. The independent addressing of color map memories 4, 5 and 6 also facilitates the generation of false-color presentations.

FIG. 5 shows another way for pixel data to flow from input pixel data latch 2 to pre-address registers 15, 25 and 35 in formatter 7. The pixel data in latch 2 is sixteen-bit pixel data, to conserve computer main memory, and has been padded with eight succeeding ZEROs prior to being entered into latch 2. These two bytes of pixel data comprise four bits ABCD of blue primary, five bits JKLMN of red primary and seven bits STUVWXY of green primary.

The eight-bit first mask (as stored in mask register 38 has four ONEs as most significant bits to select blue information followed by four ZEROs as less significant bits to mask red information. Accordingly, the four most significant bits ABCD of latch 2 contents are selected by AND gates in rank 39 for insertion into first pre-address register 15 as more significant bits succeeded by four ZERO less significant bits.

The sixteen-bit second mask (stored in mask register 41) has four ZEROs as most significant bits for masking blue information, followed by five ONEs for selecting red information, followed by seven ZEROs for masking green information. Shifter 43 justifies the 0000 JKLM N000 0000 red information response at the outputs of rank 42 of AND gates to JKLM N000 0000 0000; and the first eight bits, JKLM N000, of shifter 43 output are inserted into second pre-address register 25.

The twenty-four bit third mask (as stored in mask register 31) has nine ZEROs as most significant bits to mask blue and red information, followed seven ONEs for selecting green information, followed by eight bits, shown as ZEROs. Shifter 33 justifies the 0000 0000 OSTU VWXY 0000 0000 green information response at the outputs of rank 32 of AND gates to STUV WXYO 0000 0000 0000 0000; and the initial eight bits, STUV WXYO, of shifter 33 output are inserted into third pre-address register 35.

It is of interest that organizing the pixel data in input latch 2 with the four bits of blue information first, the five bits of red information second and the seven bits of green information last minimizes the number of shift signals to be generated to justify the data loaded into pre-address registers 15, 25 and 35. This shortens the time required to re-program the formatter 7.

FIG. 6 illustrates how formatter 7 can handle pixel data coded in color map addresses. Six-bit color map read addresses AB CDEF encode $2^6$ colors, each color having a unique combination of hue, color saturation and luminance. These six-bit color map read addresses are padded with eighteen less significant bits in pixel latch 2. If these eighteen less significant bits are ZEROs, whether the two least significant bits of the first mask, the ten least significant bits of the second mask and the eighteen least significant bits of the third mask are ONEs or ZEROs is of consequence only if pixel input latch 2 is called upon to perform pixel-grabbing, a function to be considered further on in the specification. Alternatively, if the two least significant bits in the first mask are ZEROs, if the ten least significant bits in the second mask are ZEROs and if the eighteen least significant bits in the third mask are ZEROs, whether the eighteen least significant bits of latch 2 contents are ONEs or ZEROs is of no consequence. At least one of these alternative conditions should obtain; the presence of both is indicated in FIG. 6.

The first mask (as stored in mask register 38) has six ONEs as more significant bits and two ZEROs as less significant bits, so the rank 39 of AND gates supplies ABCD EF00 as input for pre-address register 15. The second mask (as stored in mask register 41) has six ONEs as more significant bits and ten ZEROs as less significant bits, so the rank 42 of AND gates supplies ABCD EF00 0000 0000 as input to shifter 43. Since the second mask has a ONE in its most significant place, this input requires no justification to form shifter 43 output; and pre-address register 25 is loaded with its eight most significant bits, ABCD EF00. The third mask (as stored in mask register 31) has six ONEs as more significant bits followed by eighteen ZEROs, so the rank 32 of AND gates supplies ABCD EF00 0000 0000 0000 0000 as input to shifter 33. Again justification is not required and shifter 33 loads pre-address register 35 with ABCD EF00. Consider now the color map memories 4, 5 and 6 are loaded with color map data for operating with the read addresses per FIG. 6; this will be illustrative of the general process for loading these memories with color map data. The $2^6$ color map addresses possible with six-bit pixel data codes are cyclically generated as write addresses for color map RAMs 4, 5, 6 and the respective primary color component drive signals to the display device to be associated with that address are written into the RAMs at suitable times. This can always be done prior to the FIG. 2 display processor processing display or during field retrace interval. Where computer main memory uses VRAMs permitting rapid down-loading to rewrite RAMs 4, 5 and 6, these color map memories can be rewritten in whole or in substantial part during a line retrace interval, as well. If RAMs 4, 5, 6 are dual-ported, updating of the color maps these RAMs contain can be done piecemeal during line trace intervals, too.

Eight-bit color map read addresses may be used as pixel data to encode $2^8$ colors, or a fewer number m of bits may be used as pixel data to encode $2^m$ colors, assuming the same color map read addresses are applied to each of the RAMs 4, 5, 6. This is similar to prior art color mapping practice. However, since the color map memories are independently addressed, three eight-bit color map read addresses permit $2^8 \times 2^8 \times 2^8$ or $2^{24}$ different colors to be mapped. Where the read addresses are p-bits, q-bits and r-bits long, respectively, $2^{(p+q+r)}$ colors can be mapped. Where $p=q=r=m$, $2^{3m}$ colors can be mapped, $2^{2m}$ times as many as in prior art color mapping practice where the three color maps all receive the same read address. One should note, however, that not all these extra colors may be truly useful, having large chrominance values without correspondingly large luminance values.

Consider now how different pixel formats are accommodated by the FIG. 3 formatter 8. The FIG. 1 formatter 3 not only can be operated to simulate the performance of the FIG. 2 formatter 7, but also can be operated to simulate the performance of the FIG. 3 formatter 8 now to be described. FIGS. 7–10 abstract the FIG. 3 block schematic diagram to indicate the nature of the pixel data contained in input pixel data latch 2; in mask registers 38, 41 and 31; and in pre-address registers 15, 25 and 35. In considering FIGS. 7–9 assume the first, second and third indices to be zero-valued, so the contents of the pre-address registers 15, 25 and 35 correspond to the read addresses of color map memories 4, 5 and 6 respectively. FIG. 10 also indicates the nature of the indices stored in index registers 17, 27 and 37 and the nature of the read addresses applied to color map memories 4, 5 and 6 from the output connections of the ranks 16, 26 and 36 of OR gates.

Figure 7:
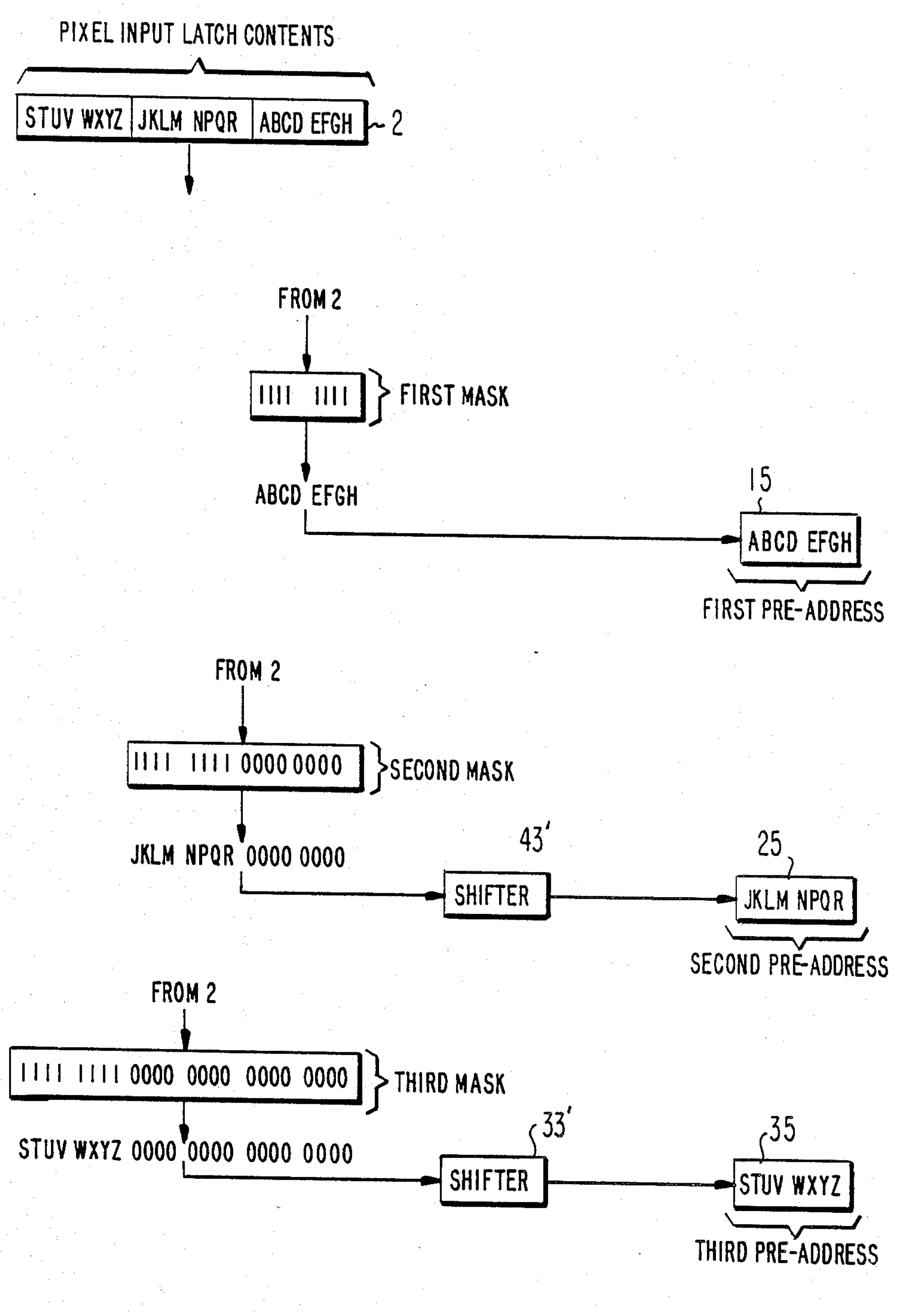

FIG. 7 shows how pixel data flows from latch 2 to pre-address registers 15, 25 and 35 in formatter 8 when 8-bit red, 8-bit green, 8-bit blue pixel descriptions, for example, are used in computer main memory. The same type of pixel data flow occurs when 8-bit Y, 8-bit I, 8-bit Q or 8-bit Y, 8-bit (R-Y), 8-bit (B-Y) pixel descriptions are used in computer main memory.

The three-byte pixel data input latch 2 is filled with a 24-bit number STUV WXYZ JKLM NPQR ABCD EFGH where each letter represents either a ONE or ZERO. The eight-bit first mask (as stored in mask register 38) is all ONEs; and ABCD EFGH, the final eight bits of latch 2 content, are selected by AND gates in rank 39 for insertion into first pre-address register 15. The sixteen-bit second mask (as stored in mask register 41) is eight ONEs in its more significant places followed by eight ZEROs in its less significant places. JKLM NPQR, the middle eight bits of latch 2 content, are selected by AND gates in rank 42, are shifted by shifter 43', and are inserted into second pre-address register 25. The twenty-four bit third mask (as stored in mask register 31) has eight ONEs in its more significant places followed by sixteen ZEROs in its less significant places. STUV WXYZ, the eight most significant bits of latch 2 content, are selected by AND gates in rank 32, are shifted by shifter 33', and are inserted into third pre-address register 35.

In this mode of operation the first, second and third indices are zero-valued; and each of the color map memories 4, 5, 6 may store in its storage locations output signals equal to the read addresses for those storage locations. This in effect forwards the contents of the pre-address registers 15, 25 and 35 as drive signals to the display device. Alternatively, each of the first, second and third indices are zero-valued; and the color map memories may be programmed to provide non-linear response to the contents of pre-address registers 15, 25 and 35.

Figure 8:
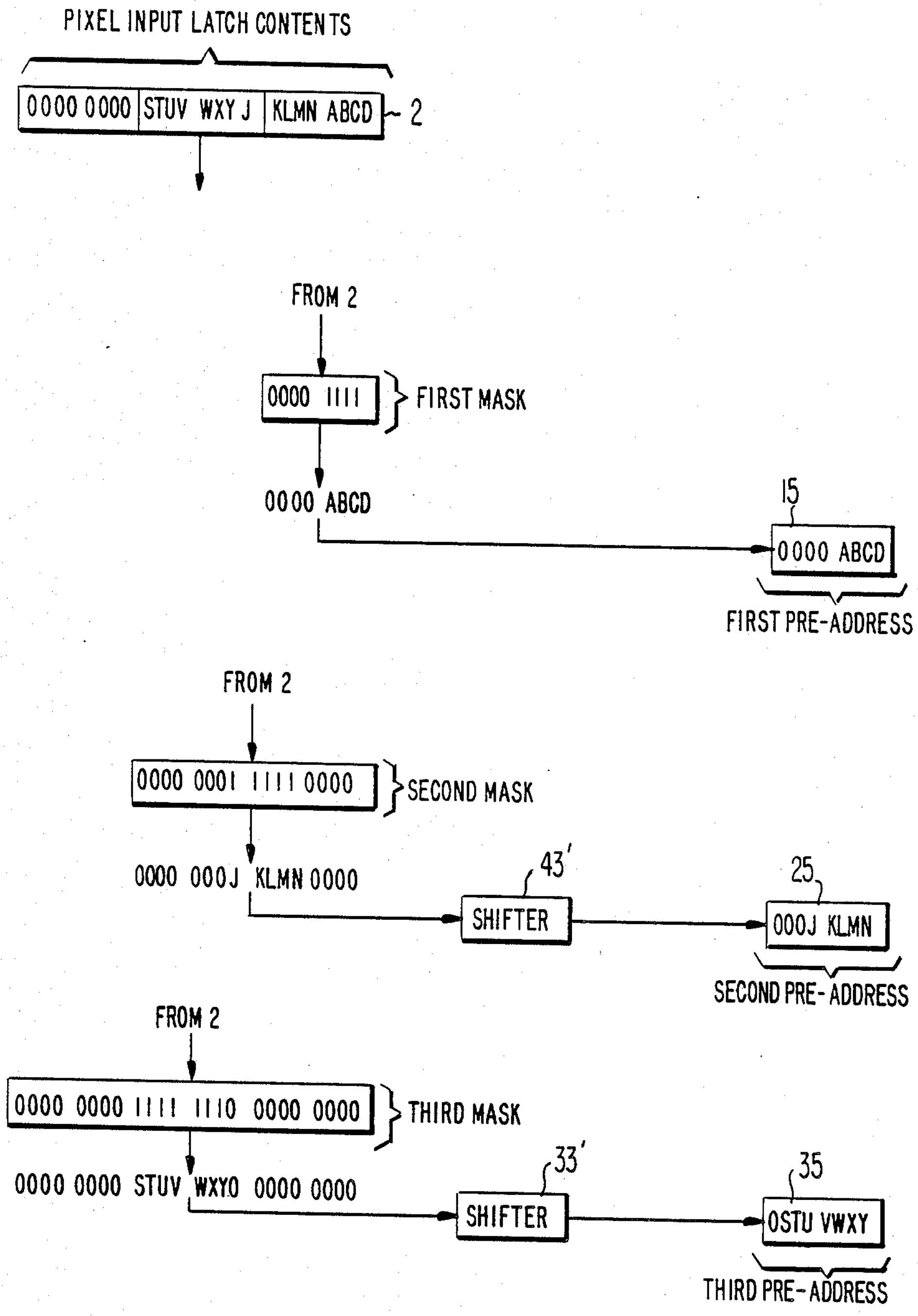

FIG. 8 shows another way for pixel data to flow from input pixel data latch 2 to pre-address registers 15, 25 and 35 in formatter 8. The pixel data in latch 2 is sixteen-bit pixel data, to conserve computer main memory, and has been padded with eight preceding ZEROs prior to being entered into latch 2. These two bytes of pixel data comprise seven bits STUVWXY of green primary, five bits JKLMN of red primary and four bits ABCD of blue primary.

The eight-bit first mask (as stored in mask register 38) has four ZEROs as most significant bits to mask red information followed by four ONEs as least significant bits to select blue information. Accordingly, the four least significant bits ABCD of latch 2 contents are selected by AND gates in rank 39 for insertion into first pre-address register 15 as least significant bits preceded by four ZERO more significant bits.

The sixteen-bit second mask (stored in mask register 41) has seven ZEROs as most significant bits for masking green information, followed by five ONEs for selecting red information, followed by four ZEROs for masking blue information. Shifter 43' justifies the 0000 000J KLMN 0000 red information response at the outputs of rank 42 of AND gates to 0000 0000 000J KLMN and the final eight bits, 000J KLMN, of shifter 43' output are inserted into second pre-address register 25.

The twenty-four bit third mask (as stored in mask register 31) has any eight most significant bits (shown as ZEROs), followed by seven ONEs for selecting green information, followed by nine ZEROs to mask red and blue information. Shifter 33' justifies the 0000 0000 STUV WXY0 0000 0000 green information response at the outputs of rank 32 of AND gates to 0000 0000 0000 0000 0STU VWXY; and the final eight bits, 0STU VWXY of shifter 33' output are inserted into third pre-address register 35.

Figure 9:
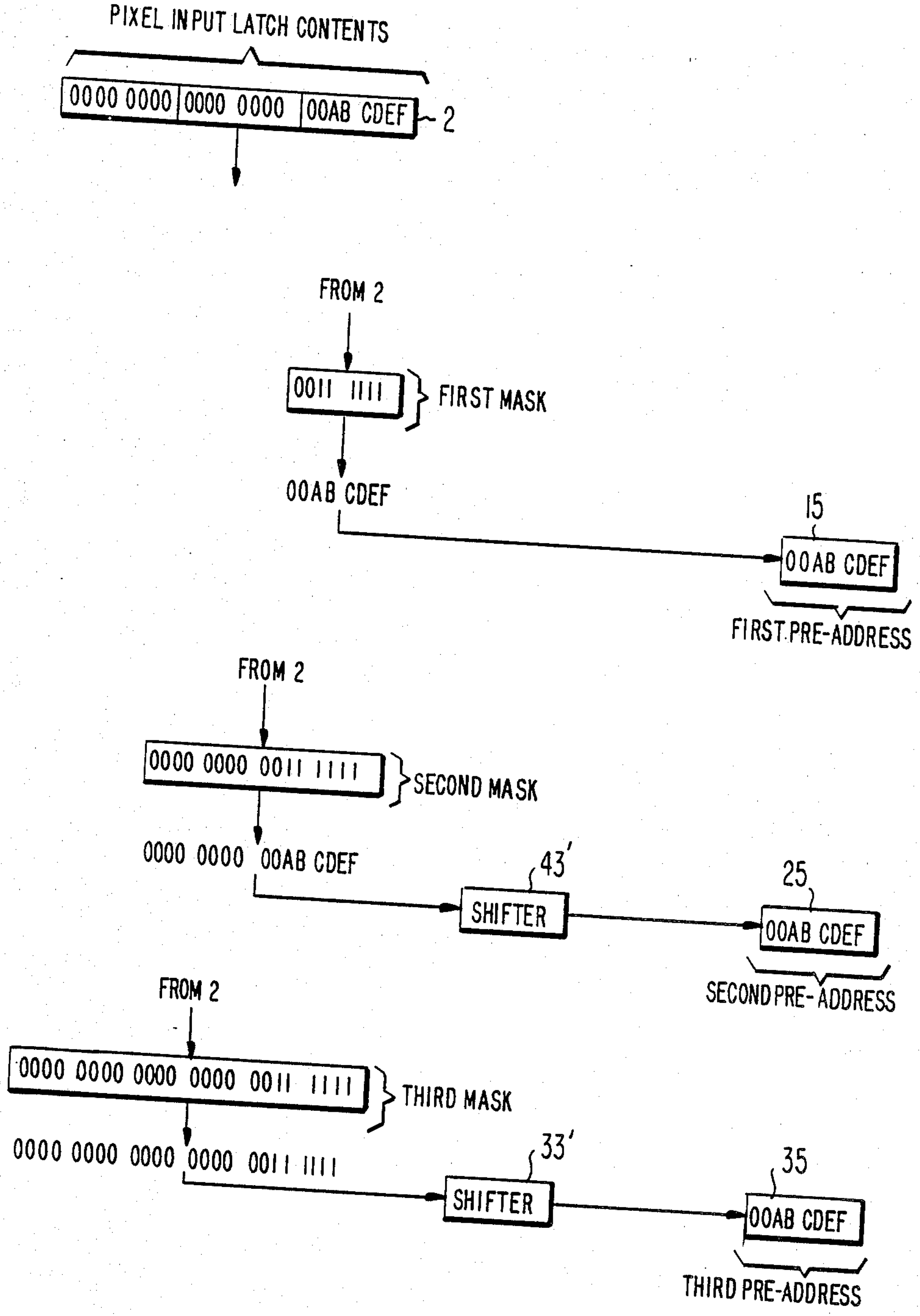
Figure 10:
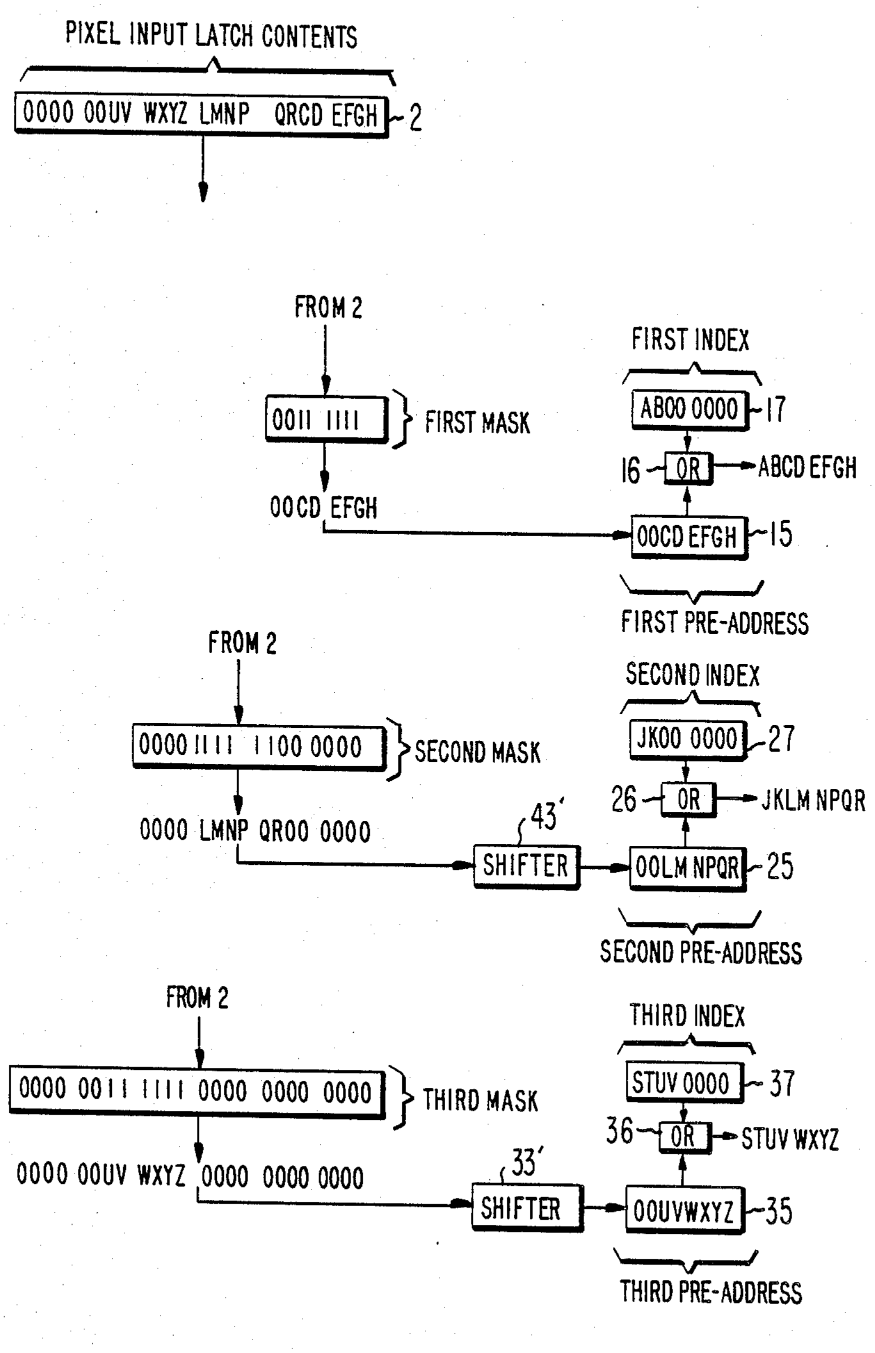

FIG. 9 illustrates how formatter 8 can handle pixel data coded in color map addresses. Six-bit color map read addresses AB CDEF encode $2^6$ colors, each color having a unique combination of hue, color saturation and luminance. These six-bit color map read addresses are padded with eighteen more significant bits in pixel latch 2. If these eighteen more significant bits are ZEROs, whether the two least significant bits of the first mask, the ten most significant bits of the second mask and the eighteen most significant bits of the third mask are ONEs or ZEROs is of consequence only if pixel input latch 2 is called upon to perform pixel-grabbing, a function to be considered further on in the specification. Alternatively, if the two most significant bits in the first mask are ZEROs, if the ten most significant bits in the second mask are ZEROs and if the eighteen most significant bits in the third mask are ZEROs, whether the eighteen most significant bits of latch 2 contents are ONEs or ZEROs is of no consequence. At least one of these alternative conditions should obtain; the presence of both is indicated in FIG. 9.

The first mask (as stored in mask register 38) has two ZEROs as more significant bits and six ONEs as less significant bits, so the rank 39 of AND gates supplies 00AB CDEF as input for pre-address register 15. The second mask (as stored in mask register 41) has ten ZEROs as more significant bits and six ONEs as less significant bits, so the rank 42 of AND gates supplies 0000 0000 00AB CDEF as input to shifter 43'. Since the second mask has a ONE in its least significant place, this input requires no justification to form shifter 43' output; and pre-address register 25 is loaded with its eight least significant bits, 00AB CDEF. The third mask (as stored in mask register 31) has eighteen ZEROs as more significant bits followed by six ONEs, so the rank 32 of AND gates supplies 0000 0000 0000 0000 00AB CDEF as input to shifter 33'. Again justification is not required and shifter 33' loads pre-address register 35 with ABCD CDEF.

The formatter 3 of FIG. 1 provides unusual flexibility in handling a plurality of pixel data modes without having to reload the color map RAMs 4, 5 and 6. This facilitates on-the-fly, real-time generation of displays that are composite images using components drawn from separate image sources. Much of this flexibility is retained in each of the formatters 7 and 8 of FIGS. 2 and 3.

Consider composite display imagers wherein: a first component image is described in terms of a linear color code, similar to that customarily used with camera-originated image processing, which code lends itself to supplying independent read addresses to RAMs 4, 5, 6; and a second component image is a graphics image described in terms of another, arbitrary color code, which requires supplying read addresses in parallel to RAMs 4, 5, 6. When going from one pixel data format to the other, the first, second and third masks are reloaded into the mask registers 11, 21, 31 or 38, 41, 31. But additionally the first, second and third indices are re-loaded into index registers 17, 27 and 37 to address different portions of the RAMs 4, 5 and 6 than were addressed for the other component image.

For example, consider the formatter 7 of FIG. 2 operated so the first component image uses the sixteen-bit pixel code format described in conjunction with FIG. 5 and the second component image uses the six-bit pixel code format described in conjunction with FIG. 6. Neither set of codes results in a pre-address that has a ONE as its least significant bit. So all the pre-addresses that can be generated by either one of the coding schemes cannot claim more than half the storage locations available in each of the RAMs 4, 5, 6. This means that the respective color map information of each coding scheme can be spatially multiplexed into the RAMs. The pre-addresses in registers 15, 25 and 35 may be applied without modification as read addresses to RAMs 4, 5 and 6 for reading locations storing color pixel data in terms of a linear pixel code. That is, to read any address location which modulo two equals zero in RAM 4, to read any address location which modulo two equals zero in RAM 5, and to read any address location which modulo two equals zero in RAM 6. This is done responsive to the first, second and third indices in index registers 17, 27 and 37 each being ZERO in all bit places. The first, second and third indices in index registers 17, 27 and 37 may each be made 0000 0001 to read an alternate set of locations in RAMs 4, 5 and 6 when the pixel data is arbitrarily coded. That is, the pre-addresses in registers 15, 25 and 35 are augmented by unity to supply read addresses to RAMs 4, 5 and 6; and in these alternate sets of storage locations the RAMs store the decoding information for the arbitrary color codes in accordance with the color mapping principle.

In actuality, since the two least significant bits of the first, second and third pre-addresses stored in registers 15, 25 and 35 are ZEROs in the FIG. 6 pixel coding scheme, the pixel coding schemes of FIGS. 5 and 6 take up no more than three-fourths of the addressable storage locations in color map memories 4, 5 and 6. An additional pixel coding scheme can be accommodated by using 0000 0011 indices in index registers 17, 27 and 37, as long as this pixel coding scheme involves pre-addresses that have ZEROs as their two least significant bits.

In another example of going from one pixel data format to another, consider the formatter 8 of FIG. 3 operated so the first component image uses the sixteen-bit pixel code format described in conjunction with FIG. 8 and the second component image uses the six-bit pixel code format described in conjunction with FIG. 9. Neither set of codes results in a pre-address that has a ONE as its most significant bit. So all the pre-addresses that can be generated by either one of the coding schemes cannot claim more than half of the storage locations available in each of the RAMs 4, 5, 6. This means that the respective color map information of each coding scheme can be spatially multiplexed into the RAMs. The pre-addresses in registers 15, 25 and 35 may be applied without modification as read addresses to RAMs 4, 5 and 6 for reading locations storing the pixel data linearly coding color information. This is done responsive to the first, second and third indices in index registers 17, 27 and 37 each being ZERO in all bit places. The first, second and third indices in index registers 17, 27 and 37 can each be made 1000 0000 to read an alternate set of locations in RAMs 4, 5 and 6 when the pixel data is arbitrarily coded. An additional pixel coding scheme wherein pre-addresses never have ONEs in their most significant and secondmost significant bits can also be employed without having to extend or re-program the color map memories 4, 5 and 6. The first, second and third indices in index registers 17, 27 and 37 will be 1100 0000 for such an additional pixel coding scheme.

In formatter 8 of the FIG. 3 display processor the multiplexing of the storage locations in color map memories 4, 5 and 6 to serve different sets of pixel codes can be carried out without having to separate the codes into ranges that are integral powers of two in extent. This is the limitation imposed by using ranks 16, 26 and 36 of OR gates to combine the first, second and third indices with the first, second and third pre-addresses. If the ranks 16, 26 and 36 of OR gates are replaced by respective adders, the code ranges may be arbitrarily chosen.

Consider composite display images wherein each component image is camera-originated or linearly codes the pixel color components, but where one component image is specified in color coordinates having higher amplitude resolution than those another component image is specified in. The pixel data for these two component images might be coded as in FIGS. 4 and 5 respectively assuming formatter 3 of FIG. 1 or formatter 7 of FIG. 2 is being used. Since mask justification and the justifications of pixel data passed through the first, second and third masks are in the direction of more significance, the same functions in color map RAMs 4, 5 and 6 will accommodate the pixel data of either component image. The composite display image can be assembled in real time, on-the-fly. A transition period between component images would appear in the composite image if color map memories 4, 5 and 6 had to be reloaded, presuming the transition did not fall between scan lines in the display.

In the formatter 3 of FIG. 1, the transition between component images linearly-coded with differing amplitude resolutions requires only first, second and third mask loads to registers 11, 21 and 31 and first, second and third shift control loads to registers 14, 24 and 34. This register loading can proceed much more rapidly than the re-loading of color map RAMs 4, 5 and 6, especially if the loading procedures are performed at least to a degree parallelly in time.

In the formatter 7 of FIG. 2, the transition between component images linearly coded with differing amplitude resolutions requires only first, second and third mask loads to mask registers 38, 41, 31. Transition in formatter 7 takes the time to load the masks and to perform justifications, a time much shorter than loading RAMs 4, 5, 6. Faster justification circuits can make these transitions invisible in display. A data processor that utilizes banking or time division multiplexing by replicating the formatter 7 a few fold and running the formatters in staggered phasing on staggered sets of successively scanned pixels, can be operated to make these transitions invisible in the display also, even using the slower justification circuits. Banking operation will be described further with reference to FIG. 13 hereinafter.

In the formatter 8 of FIG. 3 the justification of the first, second and third pre-address in the direction of least significance results in two set of read addresses for each of the RAMs 4, 5 and 6. If underlength pixel data are extended by entering ZEROs in the more significant bit places of pixel input latch 2 output, the resulting set of shorter-bit-length read addresses is not a subsampling of the set of longer-bit-length read addresses. So, the color map memories 4, 5 and 6 undesirably have to be re-loaded going from one component image to the other. More complex formatting of the data loaded into pixel input latch 2 can be done to overcome this shortcoming, however.

This shortcoming in a formatter like 8 also can be circumvented by providing for color map read addresses that have one bit more resolution than that required to map any video source. The indexing schemes previously described to provide spatial multiplexing in color map memory storage locations can then be employed to avoid the need for color map reloading when making the transition from one video source to another video source with a differing degree of amplitude resolution in one or more of its components.

The index registers 17, 27 and 37 are shown in FIGS. 1, 2 and 3 as having as many bit places as the pre-address registers 15, 25 and 35; and there is a commensurate number of OR gates in ranks 16, 26 and 36. The FIG. 2 formatter 7 can be simplified so that OR gates and index registers to supply their first inputs may be used to accommodate second inputs from only the less significant bit places of the pre-address register 15, 25, 35 outputs. The more significant bit places of the pre-address register 15, 25, 35 outputs may be applied directly to RAMs 4, 5 and 6 as the more significant portions of their read addresses. Simpler indexing arrangements are also possible in the FIG. 3 formatter 8. OR gates and index registers to supply their first inputs may be used to accommodate second inputs from only the more significant portions of their read addresses. The less significant bit places of the pre-address registers 15, 25 and 35 are then applied directly to RAMs 4, 5 and 6 as the less significant portions of their read addresses. Reducing the number of OR gates in ranks 16, 26 and 36 in the FIG. 3 formatter 8, however, interferes with a programming trick, which is very powerful in reducing image memory requirements in computer main memory and is more easily carried out n the FIG. 2 display processor than in the FIG. 3 display processor.

FIG. 10 is helpful in understanding specifically how this programming trick is carried out in the FIG. 2 display processor. It is desired to describe pixels in terms of eight-bit primary color components, as in the FIG. 7 case, but to take advantage of the fact that the more significant bits of these primary colors change less frequently than their less significant bits. By way of example, presume that the two most significant bits AB of the first primary color component do not change over a number of successively scanned pixels. Then it is not necessary to reiterate AB in the pixel codes for this succession of pixels as stored in the image memory portion of the main computer memory. Presume further that the two most significant bits JK of the second primary color component also change relatively infrequently compared to pixel scan rate, so it is unnecessary to reiterate JK at pixel scan rate in the pixel codes: Presume still further that the two most significant bits ST of the third primary color component also change relatively infrequently compared to pixel scan rate so its unnecessary to reiterate ST at pixel scan rates in the pixel codes.

The pixel codes introduced at pixel scan rate into pixel input latch 2 take the format 0000 00UV WXYZ LMNP QRCD EFGH. That is, the relatively slow changing bits A, B, J, K, S and T are suppressed in the pixel codes supplied at the pixel scan rate. Whenever there is a change in the two most significant bits AB of the first primary component, the updated bits AB could be down-loaded from computer main memory into the two most significant bit places of first index register 17. Whenever there is a change in the two most significant bits JK of the second primary color component, the updated bits JK could be down-loaded from computer main memory into the two most significant bit places of second index register 27. Whenever there is a change in the two most significant bits ST of the third primary color component, the updated bits ST could be down-loaded into the two most significant bit places of third index register 37. The six least significant bit places in each of the index register 17, 27 and 37 have ZEROs maintained in them.

Generally, it is preferable from the standpoint of simplifying computer control of display to arrange that the down-loading of the index registers 17, 27 and 37 be constrained to occur during an index register load interval that is a short portion of line retrace interval. When this is done, the pixel codes for each successive line scan can be changed during index register load interval, based on how many more significant bits in each of the primary color components is subject to change before the next index register load interval. The FIG. 1 display processor can carry forward this pixel code abbreviation process for all bit places, although it is likely to be useful only for more significant bit places in the primary color components.

Suppose one arranges for formatting the pixel codes loaded into input pixel latch 2 to include not just prefix ZEROs, or just suffix ZEROs, but also interspersed ZEROs. Then, substantially the same color mapping functions can be carried forward in formatter 7 as in formatter 8, and vice versa.

The loading of the mask registers 11, 21 and 31 of formatter 3 in FIG. 1 and of the mask registers 38, 41 and 31 of formatters 7 and 8 of FIGS. 2 and 3 is normally carried forward by down-loading from the computer main memory during portions of line retrace intervals. The loading of the index registers 17, 27 and 37 of formatters 3, 7 and 8 is normally carried forward by down-loading from the computer memory during other portions of line retrace intervals. The loading of the shift control registers 14, 24 and 34 of FIG. 1 formatter 3 normally takes place similarly. One can provide for transitions between various modes of operation during line scan, however. This may be done by providing sets of each of these registers which can be multiplexed among. The multiplexing between two registers in a set—say, two first mask registers 11*a* and 11*b*—can be controlled conveniently as follows. A set-reset flip-flop controls the multiplexer selecting between first mask registers 11*a* and 11*b*. During each line retrace interval this flip-flop is reset, so the first mask register 11*a* is selected for supplying the first mask. The outputs of color map RAMs 4, 5 and 6 are applied to first and second decoders that respond to respective conditions of the RAMs outputs designated as SET FLAG and RESET FLAG condition. When the pixel code transferred from computer main memory into pixel input latch 2 is one that causes RAMs 4, 5 and 6 outputs to be in the SET FLAG condition, the first decoder responds to set the flip-flop so the multiplexer selects first mask register 11*b* for supplying the first mask. When the pixel code transferred from computer main memory into pixel input latch 2 is one that causes RAMs 4, 5 and 6 outputs to be in the RESET FLAG condition, the second decoder responds to reset the flip-flop so the multiplexer again selects the first mask register 11*a* for supplying the first mask. The same flip-flop can control selection between paired second mask registers, paired third mask registers, paired first index registers, paired second index registers, paired third index registers, etc. More complex multiplexing arrangements of registers are also readily designed.

FIG. 11 display processor is a simplification of the FIG. 2 display processor. In the formatter 18 of the FIG. 11 display processor the 24-bit third mask register 31, the rank 32 of twenty-four AND gates, shifters 33 and 48, most-significant-bit detector 49, counter 47, third pre-address register 35, the rank 36 of twenty-four OR gates, and the third index register 37 are eliminated. The third color map memory 6 receives the same read addresses as the first color map memory 4. The serial output port of computer main memory connects to a bus that is two bytes (sixteen bits) wide from which bus a shortened pixel input latch 2′ is loaded.

The FIG. 11 display processor is especially adapted for operation wherein the first color map memory 4 contains in its storage locations respective values of a first chrominance-only primary color such as I or (R-Y), wherein the second color map memory 5 contains in its storage locations respective values of a luminance-only primary color Y, and wherein the third color map memory 6 contains in its storage locations respective values of a second chrominance-only primary color. This second chrominance-only primary color would be Q if the first chrominance-only primary color were I and would be (B-Y) if the first chrominance primary color were (R-Y), by way of specific examples. The two color map memories 4 and 6 may be combined in a single color map memory with address width being unchanged, but with write input and read output widths being doubled in number of bit places; this equivalency should be considered when constructing the claims. When simple computer generated graphics are being used, the color map memories 4, 5 and 6 can be re-loaded by down-loading from computer main memory during a portion of a field retrace interval or (usually) a portion of a line retrace interval.

Displays of the quality normally associated with camera-originated images can also be processed. The second color map memory 5 storing Y values is preferably reloaded by down-loading from computer main memory during field retrace intervals. The first color map memory 4 and the third map memory 6 storing chrominance values are reloaded by down-loading from computer main memory during field retrace intervals, as well as during line retrace intervals to the extent needed when tracing the field. In a display with 3:4 aspect ratio, 480 active lines and square pixels, there will be 640 pixels per line corresponding to 6 MHz video bandwidth in luminance for a thirty frame per second display device. If chrominance is restricted to 1.2 MHz video bandwidth, there are only 128 pixels per line for chroma. This number of pixels can be specified in a chrominance-only color map with seven-bit read addresses, such as that provided by color map memories 4 and 6 receiving the same read addresses in parallel.

Consider the case where during any line trace interval color map memories 4 and 6 have read addresses descriptive of two adjacent scan lines supplied to them on time-interleaved basis, so the read outputs of these memories can be spatially-interpolated. Assume the rate at which the rate-buffering memory preceding the display process if loaded to be the same rate as luminance pixels are written in the display, and line retrace interval to be 128 luminance pixel durations. The 128 read addresses that must be loaded into the rate-buffering memory every second line of each field of two-field frames will take one line retrace interval to load. This leaves alternate line retrace intervals to re-write color map memories 4 and 6, supposing the mask and index registers are updated during field trace from the random-access port of computer main memory. Suppose the rate at which color map memories 4 and 6 are rewritten is also the same as luminance pixels are written in the display. If color map memories 4 and 6 have 128 entries in them, it will require two scan lines to elapse before they can be completely rewritten. This is usually adequate because it is likely that substantial correlation will be found among chrominance pixels in the two line wide region. It is rare that a line trace interval does not have a number of similar chrominance pixels, or that a pair of successive line trace intervals do not have similar chrominance pixels. Where problems arise spatial resolution in chrominance must be sacrificed for a time.

When displays of the quality normally associated with camera-originated images are processed, normally the read addresses supplied in parallel to color map memories 4 and 6 will not comprise two groups of bits, each group linearly coding a respective chrominance-only primary color. The reason for this is that one wishes to specify with as much precision as possible those regions in color space which are actually occupied by the chroma pixels in the current line trace intervals, and not to specify unoccupied regions in color space. One is attempting to describe, with eight-bit read addresses for both color map memories 4 and 6, the chrominance values for that specific line trace interval with precision in the chrominance amplitude regime that is at least as good as that available with independent eight-bit read addresses for color map memories 4 and 6 in FIG. 2 formatter 7. That is, one is attempting to replace up to sixteen bits of read addressing capability with at most eight bits of read addressing. Since the read addresses supplied to color map memories 4 and 6 are not linear codes of chrominance values, assuming these read addresses are supplied from computer main memory in a relatively sparse spatial sampling compared to the read addresses supplied to color map memory 5, the spatial interpolation of chrominance values in the FIG. 11 display processor has to be carried out in the regime of color map memory 4 and 6 read outputs, rather than in the regime of their read addresses, in the FIG. 11 display processor.

FIG. 12 display processor is a simplification of the FIG. 3 display processor. In the formatter 19 of the FIG. 12 display processor the 24-bit third mask register 31, the rank 32 of twenty-four AND gates, shifters 33' and 48', least-significant-bit detector 29, counter 47, third pre-address register 35, the rank 36 of twenty-four OR gates, and the third index register 37 are eliminated. The same constraints on operation noted with regard to the FIG. 11 display processor apply also to the FIG. 12 display processor.

The advantages of color map operation to be obtained when the color, map memories can be reloaded during line retrace intervals are even greater in the FIG. 1, FIG. 2 and FIG. 3 display processors. In them the twenty-four bit wide bus from the serial output port of the computer main memory facilitates all three color map memories 4, 5 and 6 being written in parallel during line retrace intervals. This capability permits more complex montaging in the display, for example.

In FIG. 13 a pair of similar display processors 50 and 60, each of the same general type as the display processors of FIGS. 1, 2, 3, 11 and 12 are arranged so that they may be operated in banked operation. Banked operation provides display processing speed double that available with just one of the display processors 50, 60. In banked operation serially supplied input data is time-division-multiplexed into a plurality of separate data processing paths, and after data processing is completed in each path the parallel streams of individually processed data are time-division-multiplexed back into one stream of serial output data. This allows system throughput rate to be faster than the individual data processing throughput rate by a factor equal to the number of individual data processing streams.

Image data is supplied from the serial output port of a dual-ported RAM 70, which serves as main computer memory, to a serial-to-parallel converter 71 which converts the image data to successive blocks of thirty-two bits on 32-bit bus 72. A justifier 73 responds to commands from control circuitry 74, respective parts of which are disposed in the drawing processor and in display processors 50 and 60 to align the most significant bit of the output justifier 73 delivers to 32-bit bus 75 to correspond to the most significant bit of data for a pixel. A data splitter 76, which is a network of multiplexers controlled by control circuitry 74, breaks apart the 32-bit block on bus 75 into separate pixels. Pixel code lengths are constrained to be at $2^x$ values, where x ranges from zero to five inclusive, so the break up is exclusively in terms of whole pixel codes. The separate pixels are numbered modulo two, either by the computer keeping count of pixels or by including a bit in each pixel datum to indicate its being even or being odd.

If pixel data do not have more bits in them than can be stored in pixel input latches 52 and 62 of display processors 50 and 60, data splitter 76 will load successive even pixels into pixel input latch 52 and will load successive odd pixels into pixel input latch 62. Assume, for example, latches 52 and 62 each have 16-bit capacity. Formatters 57 and 67 are similar to FIG. 2 formatter 7, then, except for shorter input and third mask registers, shorter ranks of AND gates, smaller counters and smaller shifters. Color map memories 54, 55 and 56 in display processor 50 store blue, red and green drive signals, respectively, in digitized form. Color map memories 64, 65 and 66 in display processor 60 store blue, red and green drive signals, respectively, in digitized form. Multiplexers 81, 82 and 83 select read-outs from color map memories 54, 55 and 56 to the inputs of digital-to-analog converters 84, 85 and 86 respectively to be converted to analog blue, red and green drive signals when the display is to be written responsive to even pixel data. Multiplexers 81, 82 and 83 select read-out from color map memories 64, 65 and 66 to the inputs of DACs 84, 85 and 86 respectively to be converted to analog blue, red and green drive signals when the display is to be written responsive to odd pixel data.

If the data concerning one pixel have more bits than can be accommodated by one of the pixel input latches 52 and 62, this image data can be processed by operating display processors in truly parallel operation, where parallel operations are aligned in time, rather than in banked operation where parallel operations are skewed in time by one-pixel-duration offset. The speed advantage of banked operation must be foregone, but practically speaking this is usually acceptable to do. Many small computers are operated at double "normal" horizontal sweep rate when presenting graphics or text information, so that horizontal display resolution is doubled. The data describing graphics or text information are normally encoded in few bits per pixel format. Large number of bits per pixel formats are normally used for linearly coded camera-originated images or computer simulations of such images, and these images are almost invariably presented at "normal" horizontal sweep rate.

The concept of pixels being even or odd is not used during truly parallel operation. The lower-amplitude-resolution primary color data (i.e., blue and red) is routed through display processor 50 and the higher-amplitude-resolution color data (i.e., green) is routed through display processor 60. Then, multiplexer 81 selects color map memory 54 read-out to the input of DAC 84 to generate blue drive signal for all pixels. Multiplexer 82 selects color map memory 55 read-out to the input of DAC 85 to generate red drive signal for all pixels. Multiplexer 83 selects color map memory 66 read-out to the input of DAC 86 to generate green drive signal for all pixels. Truly parallel operation can be adapted to Y,I,Q operation, processing Y in one display processor, and processing I and Q in another display processor.

Multiplexers 81, 82 and 83 are shown in FIG. 13 as being controlled by control circuitry 74, assuming that the computer keeps count of pixels modulo two. If pixel evenness or oddness is encoded in one bit of the data concerning each pixel, this bit is decoded to control multiplexers 81, 82 and 83 instead.

The proper working of the cascade connection of serial-to-parallel converter 71, justifier 73 and data splitter 76 relies on the lengths of the pixel codes being $2^m$ bits where m is a positive integer from zero to five inclusive. This makes an even number of pixel codes fit into each four-byte (32-bit) output of serial-to-parallel converter 71. More flexibility with regard to code length can be achieved by using a regularly shifting serial-input/parallel-output register as converter 71 and timing the loading of pixel input latches 52 and 62 to operate them as "pixel grabbers". Loading is done each time the most significant bit of a pixel code is in the most significant bit place of converter 71 output. Latches 52 and 62 are alternately loaded, on even and odd pixels respectively, when banked operation of display processors 50 and 60 is employed. Latches 52 and 62 are loaded in parallel on every pixel when display processors 50 and 60 are operated truly parallel with each other.

FIG. 14 shows how the display processors described in connection with FIGS. 1, 2, 3, 11 and 12 may be connected to display apparatus. More specifically, connection to a color kinescope 90 will be described. A switch 91 is used for selectively routing the read outputs from color map memories 4, 5 and 6 through or around spatial interpolation circuitry 92. Where banking is used, as described in connection with FIG. 13, switch 91 will be preceded by the color map memory read out multiplexer. Spatial interpolation circuitry 92 does spatial interpolation after display processing, when this form of processing is selected, and it is most convenient to do spatial interpolation when the pixels are described in digitized sample data form. Preferably, spatial interpolation is carried out in both vertical and horizontal directions in the image field. This is done by transversal filtering having low-pass characteristics in both of the spatial dimensions. As noted previously in this specification, it is convenient to use a rate-buffering memory between computer main memory and the display processor, so that two adjacent lines of pixel samples can be time interleaved, alternately selecting samples from each line to be applied to the display processor to generate sequentially the groups of spatially adjacent pixel samples need for spatial interpolation circuitry 92.

Digital-to-analog converters 93, 94 and 95 convert to respective continuous analog signals the three parallel streams of pixel descriptions in digitized sample data form supplied from control map memories 4, 5 and 6. A switch 96 is used for selectively routing these analog signals to or around color matrix circuitry 97. If the analog signals from digital-to-analog converters 93, 94 and 95 are not blue, red and green signals switch 96 will route them through color matrix circuitry 97 for conversion to blue, red and green signals. Alternatively, color matrixing could be done prior to digital-to-analog conversion, but it is generally preferable to avoid doing multiplications in the digital regime.

With regard to color matrix circuitry 97, it is preferable to express the digital chrominance-only primary color components in positive numbers to simplify the digital-to-analog converters 93, 94 and 95. Also these digital chrominance-only primary color components may be scaled in amplitude so their maximum amplitudes more completely bill the dynamic range available in the number of bit places describing them. This preserves amplitude resolution in the color map memories 4, 5 and 6 and in digital-to-analog converters 93, 94 and 95. If these measures are taken, color matrix circuitry 97 will include means to remove the offsets in the chrominance-only primary color components, such as I and Q or (R-Y) and (B-Y), to restore them to signal quantities. This is done before these components are rescaled and linearly combined with luminance-only primary color component to generative additive primary color components.

The blue, red and green analog signals as amplified by video amplifiers 101, 102 and 103 are supplied as drive signals to color kinescope 90. The transconductances of video amplifiers 101, 102 and 103 are preferably made linear.

If spatial interpolation circuitry 92 after display processing is not required, it can be discarded, and selector switch 91 can be replaced by wired connections. If one of the color map memories 4, 5 and 6 always stores values of a luminance-only primary color, and if the other two color map memories store values of respective chrominance-only primary colors, color matrix circuitry 97 will invariably be needed. Circuitry 97 can then be wired in permanently, dispensing with selector switch 96. If the color map memories 4, 5 and 6 always store values of the additive primaries, color matrix circuitry 97 can be discarded, and selector switch 91 can be replaced by respective wired connections between the digital-to-analog converters 93, 94, 95 and the video amplifiers 101, 102, 103.

Consider the way that the main computer memory can be connected to the pixel input latch 2 or 2'. The main memory supplies serial output on a bus wider in terms of bit places than the pixel input latch 2 or 2' (e.g. on a 32-bit wide bus). Parallel storage registers are provided for two successive main memory outputs. The inputs of the parallel storage registers are multiplexed, and the outputs of the parallel storage registers also are multiplexed. This multiplexing is controlled by modular counting of successive accesses from main memory. Accordingly, the penultimate main memory output and the last memory output are simultaneously available in a continuous 64-bit-wide window that scans along scan line loci across the bit-map-organized pixel storage in main memory. A shifter shifts these parallel-in-time data to justify one pixel at a time. Shifting is controlled in accordance with the modular count of accesses from main memory and knowledge as to the number of bit places per pixel code. A masking procedure (controlled by knowledge as to the number of bit places per pixel code) is carried out to load one pixel at a time into the pixel input latch 2 or 2' and to fill with ZEROs the bit places left over in the pixel input latch.

In a more practical design parallel storage registers can be provided for one main computer memory read-out and part of the preceding main computer memory read-out. This is readily done with more complex input and output multiplexers to the parallel storage registers. The shifter used to justify pixels can then be made narrower in number of bit places input, and bit place shifts will be smaller.

As alluded to earlier in the specification, the circuitry to parse pixel codes described in the previous two paragraphs is modified to include rate-buffering memory where there is to be spatial interpolation of the outputs of any of the color map memories 4, 5 and 6.

What is claimed is:

1. A display processor for conditioning pixel data for use by a utilization means such as a kinescope, said processor comprising:

a first color map memory addressable by a first read address of p bits during its reading, p being a positive integer;

a first pre-address register for temporarily storing a p-bit first pre-address;

means for generating from said p-bit first pre-address said first read address;

a second color map memory addressable by a second read address of q bits during its reading, q being a positive integer;

a second pre-address register for temporarily storing a q-bit second address;

means for generating from said q-bit second pre-address said second read address;

a pixel input latch having a minimum width of (p+q) bits into which the data for respective pixels are serially loaded;

means for selecting from the contents of said pixel input latch a first number of bits from adjacent bit places, said first number being no larger than p;

means for applying the first number of bits in justified format to said first pre-address register as at least a portion of said first pre-address and applying ZEROs as any remaining portion of said first pre-address, to be temporarily stored in said first pre-address register;

means for programmably selecting from the contents of said pixel input latch second number of bits from adjacent bit places, said second number being no larger than q; said means for programmably selecting a second number of bits being of a type in which there is a choice of which bit places are to be included in said second number that is independent of which bit places are included in said first number;

means for applying the second number of bits in justified format to said second pre-address register as at least portion of said second pre-address and applying ZEROs as any remaining portion of said second pre-address, to be temporarily stored in said second pre-address register; and means coupled to said first and second color maps memories for applying data read from said color map memories to said utilization means.

2. A display processor as set forth in claim 1 having a minimum width of (p+q+r) bits in its said input latch and further including:

a third color map memory addressable by a third read address of r bits during its reading, r being a positive integer;

a third pre-address register for temporarily storing an r-bit third pre-address;

means for generating from said r-bit third pre-address said third read address;

means for programmably selecting from the contents of said pixel input latch a third number of bits from adjacent bit places, said third number being no larger than r, said means for programmably selecting a third number of bits being of a type in which there is a choice of which bit places are to be included in said third number that is independent of which bit places are included in said first number and in said second number respectively;

means for applying the third number of bits in justified format to said third pre-address register as at least a portion of said third pre-address and applying ZEROs as any remaining portion of said third pre-address, to be temporarily stored in said third pre-address register; and means for coupling said third color map memory to said utilization means.

3. A plurality of display processors as set forth in claim 2 in combination with;

means for providing time division multiplexed operation of said plurality of display processors.

4. A pair of display processors as set forth in claim 1 in combination with;

means for providing parallel operation of said pair of display processors.

5. A display processor as set forth in claim 1 wherein said justified format is one in which justification is in the direction of increased significance.

6. A display processor as set forth in claim 1 wherein said justified format is one which justification is in the direction of decreased significance.

7. A display processor as set forth in claim 1 wherein said means for selecting from the contents of said pixel input latch a first number of bits is of a type that selects the most significant bits in said pixel input latch.

8. A display processor as set forth in claim 1 wherein said means for selecting from the contents of said pixel input latch a first number of bits is of a type that selects the least significant bits in said pixel input latch.

9. A display processor as set forth in claim 1 further including:

a third color map memory addressable by said first read address.

10. A display processor for conditioning pixel data for use by a utilization means such as a kinescope, said processor comprising:

a first color map memory addressable by a first read address of p bits during its reading, p being a positive integer;

a first pre-address register for temporarily storing a p-bit first pre-address;

a first index register storing a first index therein;

means for combining said first index with said first pre-address temporarily stored in said first pre-address register to generate said first read address;

a second color map memory addressable by a second read address of q bits during its reading, q being a positive integer;

a second pre-address register for temporarily storing a q-bit second pre-address;

means for generating from said q-bit second pre-address said second read address;

a pixel input latch having a minimum width of (p+q) bits into which the data for respective pixels are serially loaded;

means for selecting from the contents of said pixel input latch a first number of bits, said first number being no larger than p;

means for applying the first number of bits in justified format to said first pre-address register as at least a portion of said first pre-address and applying ZEROs as any remaining portion of said first pre-address, to be temporarily stored in said first pre-address register;

means for selecting from the contents of said pixel input latch a second number of bits, said second number being no larger than q; said means for selecting a second number of bits being of a type in which there is a choice of which bit places are to be included in said second number that is independent of which bit places are included in said first number;

means for applying the second number of bits in justified format to said second pre-address register as at least a portion of said second pre-address and applying ZEROs as any remaining portion of said second pre-address, to be temporarily stored in said second pre-address register; and means coupled to said first and second color map memories for applying data read from said color map memories to said utilization means.

11. A display processor as set forth in claim 10 wherein said utilization means includes:

digital-to-analog converter means for converting to respective analog signals the streams of successive digitized read-outs from said first, second and third color map memories; and color matrixing circuitry for converting those analog signals to analog signals each descriptive of a respective additive primary color component.

12. A combination as set forth in claim 11 further including means for providing spatial interpolation to the read-out from at least one of said first, second and third color map memories prior to its conversion to a respective analog signal by said digital-to-analog converter means.

13. A combination as set forth in claim 11 further including:

a color kinescope; and first, second and third video amplifiers for supplying to said color kinescope as blue, red and green drive signals amplified responses to the continuous analog signals supplied to said video amplifiers from said analog-to-digital converter means.

14. A display processor as set forth in claim 10 wherein said means for combining said first index with the first pre-address consists of:

a first rank of OR gates ORing the bits temporarily stored in said first pre-address register with respective bits of said first index register to generate said first read address.

15. A display processor as set forth in claim 10; wherein said means for generating said second read address includes:

a second index register storing a second index therein; and means for combining said second index with the second pre-address temporarily stored in said second pre-address register to generate said second read addresses.

16. A display processor as set forth in claim 15 wherein said means for combining said second index with the second pre-address consists of:

a second rank of OR gates ORing the bits temporarily stored in said second pre-address register with respective bits of said second index register to generate said second read address.

17. A display processor for conditioning pixel data for use by a utilization means such as a kinescope, said processor comprising:

a pixel input latch having a minimum width of (p+q+r) bits into which the data for respective pixels are serially loaded, p, q and r being positive integers;

a first color map memory addressable by a first read address of p bits;

a first pre-address register for temporarily storing a p-bit first pre-address;

means for selecting from the contents of said pixel input latch a first number of bits, said first number being no larger than p;

means for applying the first number of bits in justified format to said first pre-address register as at least a portion of said pre-address and applying ZEROs as any remaining portion of said first pre-address; to be temporarily stored in said first pre-address register;

a first index register storing a first index therein having a number of bits therein corresponding to the number of bits in any remaining portion of said first pre-address;

means for combining said first index with said first pre-address temporarily stored in said first pre-address register to generate said first read address;

a second color map memory addressable by a second read address of q bits;

a second pre-address register for temporarily storing a q-bit second address;

means for selecting from the contents of said pixel input latch a second number of bits, said second number being no larger than q; said means for selecting a second number of bits being a type in which there is a choice of which bit places are to be included in said second number that is independent of which bit places are included in said first number;

means for applying the second number of bits in justified format to said second pre-address register as at least a portion of said second pre-address and applying ZEROs as any remaining portion of said second pre-address, to be temporarily stored in said second pre-address register;

means for generating from said q-bit second pre-address said second read address;

a third color map memory addressable by a third read address of r bits;

a third pre-address register for temporarily storing an r-bit third pre-address;

means for selecting from the contents of said pixel input latch a third number of bits, said third number being no larger than r, said means for selecting a third number of bits being of a type in which bit places are selected independent of which bit places are included in said first and second numbers of bits means for applying the third number of bits in justified format to said third pre-address register as at least a portion of said third pre-address and applying zeros as any remaining portion of said third pre-address, to be stored in said third pre-address register:

means for generating from said r-bit third pre-address said third read address; and means for coupling data read from said first, second and third color map memories to said utilization means.

18. A display processor as set forth in claim 17 wherein said utilization means comprises:

a color kinescope;

digital-to-analog convertor means for converting the streams of successive digitized read-outs from said first, second and third color map memories, to respective continuous analog signals each descriptive of a respective additive primary color component; and first, second and third video amplifiers for supplying to said color kinescope as blue, red and green drive signals amplified responses of the continuous analog signals supplied to said video amplifiers from said digital-to-analog converter means.

19. A display processor as set forth in claim 17 wherein said means for combining said first index with the first pre-address consists of:

a first rank of OR gates ORing the bits of said any remaining portion of said first pre-address with bits of said first index to generate said first read address.

20. A display processor as set forth in claim 17, wherein said means for generating said second read address includes:

a second index register storing a second index therein having a number of bits therein corresponding to the number of bits in any remaining portion of said second pre-address; and means for combining said second index with the second pre-address temporarily stored in said second pre-address register to generate said second read addresses.

21. A display processor as set forth in claim 20 wherein said means for combining said second index with the second pre-address consists of:

a second rank of OR gates ORing the bits of said any remaining portion of said second pre-address with bits of said second index to generate said second read address.

22. A display processor as set forth in claim 20, wherein said means for generating said third read address includes:

a third index register storing a third index therein having a number of bits therein corresponding to the number of bits in any remaining portion of said third pre-address; and means for combining said third index with the third pre-address temporarily stored in said third pre-address register to generate said third read address.

23. A display processor as set forth in claim 22 wherein said means for combining said third index with the third pre-address consists of:

a third rank of OR gates ORing the bits of said any remaining portion of said third pre-address with bits of said third index to generate said third read address.

24. A display processor for conditioning pixel data for use by utilization means such as a kinescope, said processor comprising:

a first color map addressable by a first read address of p bits, p being a positive integer;

a first pre-address register for temporarily storing a p-bit first pre-address;

a first index register storing a first index therein;

means for combining said first index with first pre-address temporarily stored in said first pre-address register to generate said first read address;

a second color map memory addressable by a second read address of q bits, q being a positive integer;

a second pre-address register for temporarily storing a q-bit second address;

means for generating from said q-bit second pre-address said second read address;

a third color map memory addressable by said first read address;

a pixel input latch having a minimum width of (p+q) bits into which the data for respective pixels are serially loaded;

means for selecting from the contents of said pixel input latch a first number of bits, said first number being no larger than p;

means for supplying the first number of bits in justified format to said first pre-address register as at least a portion of said first pre-address and applying ZEROs as any remaining portion of said first pre-address, to be temporarily stored in said first pre-address register;

means for selecting from the contents of said pixel input latch a second number of bits, said second number being no larger than q; said means for selecting a second number of bits being of a type in which there is a choice of which bit places are to be included in said second number that is independent of which bit places are included in said first number;

means for applying the second number of bits in justified format to said second pre-address register as at least a portion of said second pre-address and applying ZEROs as any remaining portion of said second pre-address to be temporarily stored in said second pre-address register; and means for coupling data read from said first, second and third color map memories to said utilization means.

25. A display processor as set forth in claim 24 wherein said means for selecting from the contents of said pixel input latch a first number of bits is of a type that selects the most significant bits in said pixel input latch.

26. A display processor as set forth in claim 24 wherein said means for selecting from the contents of said pixel input latch a first number of bits is of a type that selects the least significant bits in said pixel input latch.

27. A display processor as set forth in claim 24 wherein said utilization means includes:

digital-to-analog convertor means for converting to respective analog signals the streams of successive digitized read-outs from said first, second and third color map memories; and color matrixing circuitry for converting those analog signals to analog signals each descriptive of a respective additive primary color component.

28. A combination as set forth in claim 27 further including means for providing spatial interpolation to the read-out from at least one of said first, second and third color map memories prior to its conversion to a respective analog signal by said digital-to-analog converter means.

29. A combination as set forth in claim 27 further including:

a color kinescope; and first, second and third video amplifiers for supplying to said color kinescope as blue, red and green drive signals amplified responses to the continuous analog signals supplied to said video amplifiers from said analog-to-digital converter means.

30. A display processor as set forth in claim 24 wherein said means for combining said first index with the first pre-address consists of:

a first rank of OR gates ORing the bits temporarily stored in said first pre-address register with respective bits of said first index register to generate said first read address.

31. A display processor as set forth in claim 30; wherein said means for generating said second read address includes:

a second index register storing a second index therein; and means for combining said second index with the second pre-address temporarily stored in said second pre-address register to generate said second read addresses.

32. A display processor as set forth in claim 31 wherein said means for combining said second index with the second pre-address consists of:

a second rank of OR gates ORing the bits temporarily stored in said second pre-address register with respective bits of said second index register to generate said second read address.

33. A display processor as set forth in claim 24; wherein said means for generating said second read address includes:

a second index register storing a second index therein; and means for combining said second index with the second pre-address temporarily stored in said second pre-address register to generate said second read address.

34. A display processor as set forth in claim 33 wherein said means for combining said second index with the second pre-address consists of:

a second rank of OR gates ORing the bits temporarily stored in said second pre-address register with respective bits of said second index register.

35. A display processor as set forth in claim 24 wherein said justified format is one which justification is in the direction of increased significance.

36. A display processor as set forth in claim 24 wherein said justified format is one which justification is in the direction of decreased significance.

37. In combination:

a source of multi-bit pixel data words;

first and second display processors each first, second and third color map memories;

means for storing multi-bit pixel data words;

means for generating read addresses for said first color map memory from a selected portion of the bits in each word of pixel data;

first programmable means for selecting bits of said multi-bit words of pixel data independently of the portion of the bits used in generating said read address for the first color map memory, and generating read addresses for said second color map memory;

second programmable means for selecting bits of said multi-bit words of pixel data independently of the bits used in generating said read addresses for the first and second color map memories, and generating read addresses for said third color map memory;

means coupled to said source, for apportioning said multi-bit pixel data words to the means for storing multi-bit pixel data words of said first and second display processors; and means responsive to data read out from each of said first, second and third color map memories of said first and second display processors for generating a color display image.

38. A display processor for conditioning pixel data for display, said pixel data occurring as multi-bit codewords and capable of being coded in different formats, said processor comprising:

an input port for receiving said pixel data;

storage means coupled to said input port for storing codewords of said pixel data and for providing respective bits of said multi-bit codewords;

first and second color map memories having respective address input ports and respective data output ports;

first means for selecting one of bits of said multibit codeword provided by said storage means in accordance with a particular format in which said pixel data is provided;

means for coupling said selected ones of bits in justified form to the address input port of said first color. map memory;

second means for programmably selecting bits of said multibit codewords provided by said storage means independently of said ones of bits selected by said first means and in accordance with said format in which said pixel data is provided;

means for couplinng bits of said multibit codewords selected by said second means, in justified form, to the address input port of said second color map memory; and utilization means coupled to the data output ports of said color map memories.

* * * * *